(12) United States Patent
Dell et al.

(10) Patent No.: US 7,023,841 B2
(45) Date of Patent: Apr. 4, 2006

(54) THREE-STAGE SWITCH FABRIC WITH BUFFERED CROSSBAR DEVICES

(75) Inventors: Martin S. Dell, Bethlehem, PA (US); Zbigniew M. Dziong, Atlantic Highlands, NJ (US); Wei Li, Basking Ridge, NJ (US); Matthew Tota, Clinton, NJ (US); Yung-Terng Wang, Marlboro, NJ (US)

(73) Assignee: Agere Systems Inc., Allentown, PA (US)

( * ) Notice: Subject to any disclaimer, the term of this patent is extended or adjusted under 35 U.S.C. 154(b) by 888 days.

(21) Appl. No.: 10/017,174

(22) Filed: Dec. 14, 2001

(65) Prior Publication Data

US 2002/0085578 A1  Jul. 4, 2002

Related U.S. Application Data

(60) Provisional application No. 60/255,749, filed on Dec. 15, 2000.

(51) Int. Cl.
*H04L 12/50* (2006.01)

(52) U.S. Cl. ............ 370/388; 370/380; 340/2.22; 340/2.44

(58) Field of Classification Search ........ 370/422, 370/380, 388, 427, 366, 367, 58.2, 54; 340/2.22, 340/2.24, 2.26
See application file for complete search history.

(56) References Cited

U.S. PATENT DOCUMENTS

| | | | | |
|---|---|---|---|---|
| 5,124,978 A | * | 6/1992 | Chao | 370/422 |
| 5,157,654 A | * | 10/1992 | Cisneros | 370/414 |
| 5,255,265 A | * | 10/1993 | Eng et al. | 370/416 |
| 5,361,255 A | * | 11/1994 | Diaz et al. | 370/374 |
| 5,440,553 A | * | 8/1995 | Widjaja et al. | 370/411 |
| 5,497,369 A | * | 3/1996 | Wainwright | 370/390 |
| 5,500,858 A | | 3/1996 | McKeown | 370/60 |
| 5,537,403 A | * | 7/1996 | Cloonan et al. | 370/352 |
| 5,550,815 A | * | 8/1996 | Cloonan et al. | 370/396 |
| 5,555,243 A | * | 9/1996 | Kakuma et al. | 370/352 |
| 5,612,953 A | * | 3/1997 | Olnowich | 370/367 |
| 5,631,902 A | * | 5/1997 | Yoshifuji | 370/388 |
| 5,689,500 A | * | 11/1997 | Chiussi et al. | 370/235 |
| 5,689,505 A | * | 11/1997 | Chiussi et al. | 370/388 |
| 5,754,120 A | * | 5/1998 | Argentati | 340/2.22 |
| 5,852,601 A | * | 12/1998 | Newman et al. | 370/230 |
| 5,938,749 A | | 8/1999 | Rusu et al. | 710/54 |
| 6,125,112 A | | 9/2000 | Koning et al. | 370/388 |

(Continued)

*Primary Examiner*—Wellington Chin
*Assistant Examiner*—Binh Q Nguyen

(57) ABSTRACT

A switch fabric for routing data has a switching stage configured between an input stage and an output stage. The input stage forwards the received data to the switching stage, which routes the data to the output stage, which transmits the data towards destinations. Each input device of the input stage transmits bids to the crossbar devices of the switching stage to request connections through the switching stage for routing the data to the output devices of the output stage. In one aspect, each crossbar device has (1) a bid arbitrator that determines whether to accept or reject each received bid, wherein, in response to a collision between multiple bids, the bid arbitrator accepts two or more of the colliding bids in a single time slot; and (2) memory for storing one or more accepted cells for the same output device, wherein the crossbar device can transmit grant signals for two or more accepted bids for the same output device in a single time slot. In another aspect, the bid arbitrator is configured to re-consider whether to accept a stored bid that was not accepted in a previous time slot.

11 Claims, 22 Drawing Sheets

U.S. PATENT DOCUMENTS

| | | |
|---|---|---|
| 6,160,812 A | 12/2000 | Bauman et al. .............. 370/416 |
| 6,243,382 B1 * | 6/2001 | O'Neill et al. ......... 370/395.52 |
| 6,324,165 B1 | 11/2001 | Fan et al. .................... 370/232 |
| 6,430,181 B1 * | 8/2002 | Tuckey ........................ 370/386 |
| 6,438,134 B1 | 8/2002 | Chow et al. ................. 370/412 |
| 6,519,225 B1 * | 2/2003 | Angle et al. ................. 370/229 |
| 6,560,230 B1 | 5/2003 | Li et al. ................. 370/395.42 |
| 6,570,873 B1 | 5/2003 | Isoyama et al. ............. 370/375 |
| 6,762,995 B1 | 7/2004 | Drummond-Murray et al. .......................... 370/229 |
| 6,778,536 B1 * | 8/2004 | Ofek et al. ............... 370/395.4 |
| 6,829,237 B1 * | 12/2004 | Carson et al. ............... 370/386 |
| 6,864,154 B1 | 3/2005 | Charny et al. ............... 370/235 |
| 6,868,084 B1 * | 3/2005 | Konda ..................... 370/395.1 |
| 6,870,831 B1 * | 3/2005 | Hughes et al. .............. 370/352 |
| 6,907,041 B1 | 6/2005 | Turner et al. ................ 370/412 |

* cited by examiner

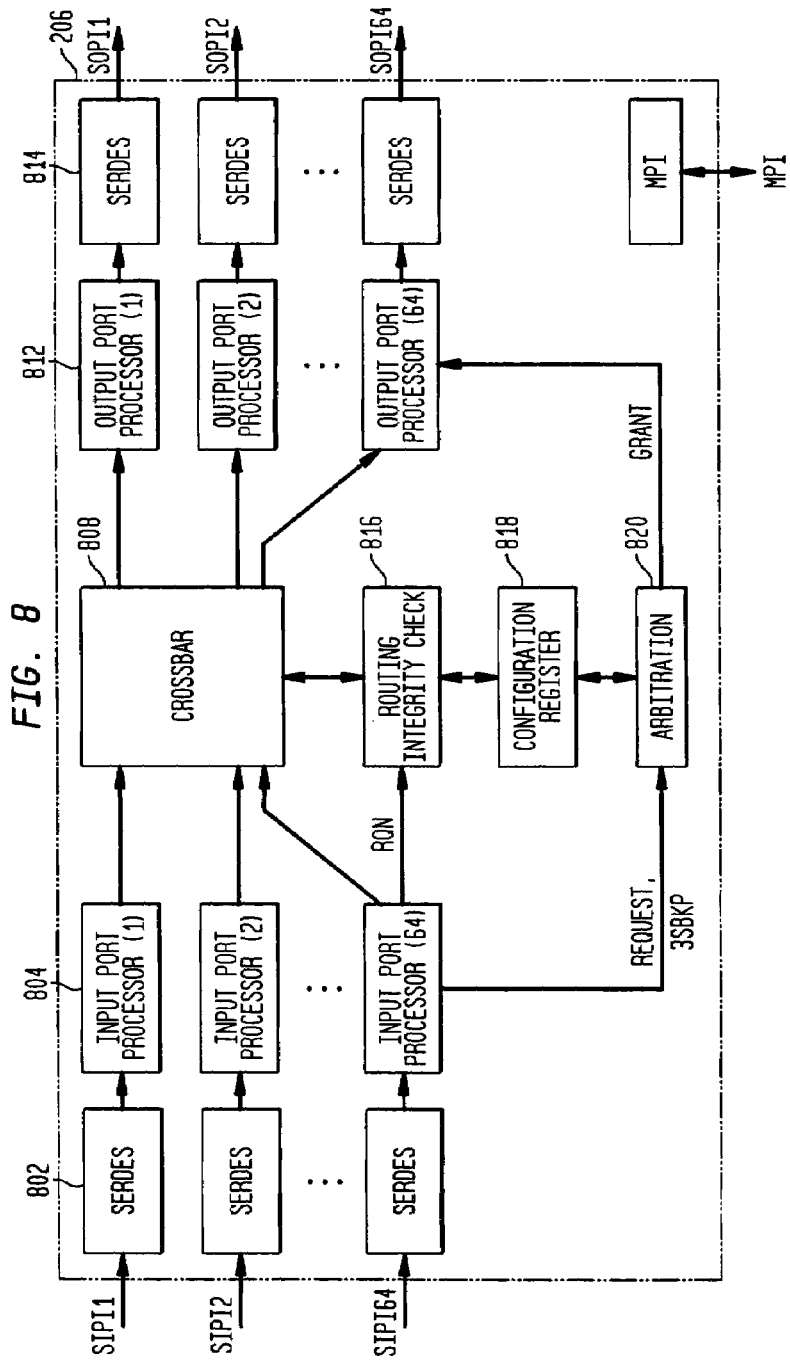

FIG. 12

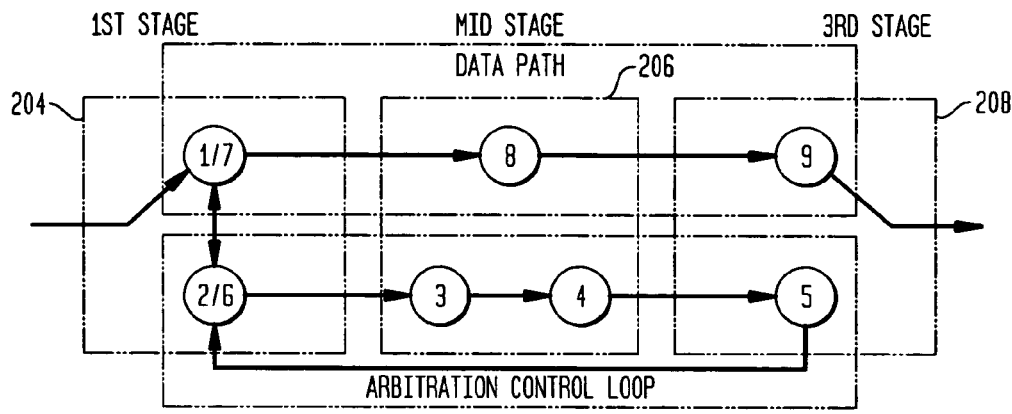

FIG. 13

| IDLEBID(1) | BIDCH(2) | RDESTD(6) | RDESTP(5) | R3QN(10) | RSRCD(6) |

FIG. 14

| DATA | SIZE | DESCRIPTION |
|---|---|---|
| IDLEBID | 1 | IDLE BID INDICATOR. IT IS EXTRACTED FROM CELL HEADER (BIDTYPE FIELD).<br>0 - IDLE BID<br>1 - VALID BID |
| BIDCH | 2 | BID CHANNEL. IT IS EXTRACTED FROM CELL HEADER (BIDTYPE FIELD).<br>0 - UNICAST GBW CHANNEL<br>1 - UNICAST BE CHANNEL<br>2 - MULTICAST GBW CHANNEL<br>3 - MULTICAST BE CHANNEL |
| R3QN | 10 | REQUESTED 3RD STAGE QUEUE NUMBER. IT IS EXTRACTED FROM CELL HEADER (REQRQN FIELD). |
| RDESTD | 6 | REQUESTED 3RD STAGE DEVICE. IT IDENTIFIES A 3RD STAGE DEVICE. IT IS EXTRACTED FROM CELL HEADER (REQDEST FIELD). |
| RDESTP | 5 | REQUESTED 3RD STAGE PORT. IT IDENTIFIES AN EGRESS PORT NUMBER OF A 3RD STAGE DEVICE. IT IS EXTRACTED FROM CELL HEADER (REQDEST FIELD). |
| RSRCD | 6 | REQUESTING 1ST STAGE DEVICE. IT IDENTIFIES A 1ST STAGE DEVICE THAT GENERATES THE REQUEST. IT IS DERIVED FROM THE INPUT LINK NUMBER. |

FIG. 21

```
FOR EACH CROSSBAR DEVICE,
    FOR EACH TIME SLOT,
        DENY ALL BIDS TO BACK-PRESSURED PORTS OR QUEUES.
        DENY ALL LOW-PRIORITY BIDS TO OUTPUT DEVICES WHEN HIGHER PRIORITY BIDS ARE PRESENT.
        FOR THE REMAINING BIDS,
            FOR EACH OUTPUT DEVICE,
                RANDOMLY SELECT ONE OF ANY CONTENDING BIDS FOR GRANT

FOR EACH INPUT DEVICE,
    FOR EACH TIME SLOT,
        FOR EACH CROSSBAR DEVICE,
            IF THE BID SUBMITTED L SLOTS EARLIER WAS GRANTED,
                TRANSMIT CELL TO THE OUTPUT DEVICE USING THE CROSSBAR DEVICE
            ELSE
                IF THE BID WAS DENIED DUE TO COLLISION,
                    BID AGAIN TO THE CROSSBAR DEVICE FOR THE SAME OUTPUT DEVICE
                ELSE
                    BID TO THE CROSSBAR DEVICE FOR THE NEXT OUTPUT DEVICE IN PRE-CONFIGURED SEQUENCE (CROSSBAR)
```

FIG. 22

```
INTITIALIZATION:
      SET WINDOW >= # OF LINKS * LATENCY;
      CREDIT = WINDOW

SCHEDULER:
      WHERE THERE IS A BACKLOG AND CREDIT > 0,
            SCHEDULE A CELL FROM VoQ;
            DECREMENT CREDIT

PENDING LOGIC:
      FOR EACH TIME SLOT,
            FOR EACH RECEIVED GRANT SIGNAL FROM EACH CROSSBAR DEVICE,
                  TRANSMIT A CELL;
                  INCREMENT CREDIT;
            SUBMIT BIDS UP TO # OF LINKS FROM THE PENDING QUEUES
```

TABLE 1

PERFORMANCE IMPROVEMENTS WITH BUFFERS AT THE CROSSBAR

| K | THROU-GHPUT [%] | MAX 3 GRANTS | MAX 2 GRANTS | GAIN [%] | MAX 3 GRANTS | MAX 2 GRANTS |
|---|---|---|---|---|---|---|
| 0 | 63.5 | | | 0.0 | | |
| 1 | 78.8 | | | 24.1 | | |
| 2 | 84.9 | | 83.62 | 33.7 | | 31.68 |
| 3 | 88.5 | 88.39 | 86.18 | 39.4 | 39.20 | 36.69 |
| 4 | 90.8 | 90.70 | 87.37 | 43.0 | 42.83 | 37.59 |
| 5 | 92.2 | 91.64 | 88.14 | 45.2 | 44.34 | 38.80 |
| 6 | 93.2 | 92.66 | 88.82 | 46.8 | 45.92 | 39.87 |
| 7 | 93.9 | 93.55 | 88.96 | 47.9 | 47.32 | 40.09 |
| 8 | 94.7 | 93.98 | 89.37 | 49.1 | 48.00 | 40.74 |
| 9 | 95.3 | 94.40 | 89.66 | 50.1 | 48.66 | 41.20 |
| 10 | 95.7 | 94.90 | 89.57 | 50.7 | 49.45 | 41.01 |
| | | | | | | |
| 15 | 97 | | | 52.8 | | |
| 20 | 98 | | | 54.3 | | |
| 30 | 99 | 97 | 90 | 55.9 | 52.76 | 41.85 |

THREE-STAGE SWITCH FABRIC WITH BUFFERED CROSSBAR DEVICES

CROSS-REFERENCE TO RELATED APPLICATIONS

This application claims the benefit of the filing date of U.S. provisional application No. 60/255,749, filed on Dec. 15, 2000. This application is one of a set of U.S. patent applications consisting of Ser. Nos. 10/017,173, 10/017,174, and 10/017,503, all of which were filed on the same date and the teachings of all of which are incorporated herein by reference.

BACKGROUND OF THE INVENTION

1. Field of the Invention

The present invention relates to data communications, and, in particular, to switch fabrics for routing packets of user data between multiple sources and destinations.

2. Description of the Related Art

FIG. 1 shows a block diagram of a prior-art three-stage switch fabric 100 for data communications. In particular, switch fabric 100 routes packets of user data received from one or more sources 102 towards one or more destinations 110. Switch fabric 100 comprises an input stage 104, a switching stage 106, and an output stage 108. Input stage 104 is configured to receive the packets of user data from sources 102, divide each packet of user data into one or more cells of user data, and transmit the cells of user data to switching stage 106. Switching stage 106 is configured to route the cells of user data received from input stage 104 to output stage 108. Output stage 108 is configured to assemble the cells of user data received from switching stage 106 into re-assembled packets of user data and transmit the re-assembled packets of user data to destinations 110.

In non-blocking switch fabrics, user data received from any particular source 102 can be routed through switch fabric 100 to any particular destination 110, independent of whether any other user data is being routed from one or more other sources towards one or more other destinations through switch fabric 100. When packets of user data transmitted from the sources are received at an input port of input stage 104, the user data is buffered for eventual transmission through switching stage 106 to output stage 108, where the routed user data is again buffered for eventual transmission to the destination via an output port of the output stage associated with that destination.

To perform these data buffering functions, input stage 104 and output stage 108 are both configured with a number of different routing queues (e.g., designated memory locations) in which the user data are temporarily stored. In prior art switch fabrics, such as switch fabric 100 of FIG. 1, there is a one-to-one relationship between the input ports and the routing queues in the input stage. In other words, all user data arriving at a particular input port is stored in a single routing queue, and all user data stored in a particular routing queue arrives at a single input port. Similarly, there is a one-to-one relationship between the routing queues in the input stage and the routing queues in the output stage. In other words, all user data that is stored in a particular routing queue in the input stage is routed to a single routing queue in the output stage, and all user data is stored in a particular routing queue in the output stage is routed from a single routing queue in the input stage. On the other hand, there is a many-to-one relationship between routing queues and output ports in the output stage. In other words, all user data that is stored in a particular set of one or more routing queues in the output stage is transmitted via a single output port, and all user data that is transmitted via a particular output port is routed from a single set of one or more routing queues in the output stage. The logical associations between input ports and routing queues in the input stage and between routing queues and output ports in the output stage are determined by the physical locations of (i.e., physical connections between) the various devices for form the input and output stages.

The input stage is implemented with a scheduler that is responsible for determining when to transmit data from the various queues in the input stage to the switching stage for routing. When the scheduler determines that a particular queue is to be serviced (i.e., have user data transmitted to the switching stage), a bid (i.e., service request) is transmitted from the input stage (e.g., encoded in the header of a cell carrying other user data in its payload) to a bid arbitrator implemented as part of the switching stage. The bid arbitrator determines whether to accept (i.e., grant) or reject (i.e., deny) the bid received from the input stage. A message is transmitted from the switching stage back to the input stage identifying whether the bid was accepted or rejected. If a bid is accepted, then a connection is eventually established within the switching stage for routing the user data associated with that granted bid. In response to receiving a granted bid message, user data is transmitted from the queue in the input stage to the switching stage for routing through the corresponding connection to the appropriate queue in the output stage.

In prior art switch fabrics, such as switch fabric 100 of FIG. 1, each bid received from the input stage is considered by the bid arbitrator in the switching stage only once, with the bid being either accepted or rejected. If a bid is rejected, then the input stage must transmit a subsequent bid for servicing the same queue to the switching stage for consideration by the bid arbitrator. Individual bids will continue to be transmitted and considered until the bid arbitrator finally accepts one for servicing that queue.

Depending on the implementation, a bid arbitrator implemented in the switching stage may use different types of information in determining whether to accept or reject a particular bid. For example, a bid arbitrator may rely on "fairness" when considering a particular bid, where "fairness" relates to the notion of equitably sharing over time the resources of the switching stage among all of the different queues in the input stage that desire service. In addition, a bid arbitrator of the prior art might be designed to take into account the status of the various queues in the output stage. In particular, if a particular queue in the output stage is currently full, then a bid arbitrator may use that information (which is transmitted from the output stage to the switching stage) to reject a current bid for service that would result in even more user data being transmitted to that queue.

SUMMARY OF THE INVENTION

With the explosive demand for bandwidth and the rapid advances in electronics and devices, communication networks are going through rapid expansion and stressing the scalability of switches and routers. In the foreseeable future, packet services using electronics switching are cost competitive for switch capacity up to tens of terabits per second (Tbps). Depending on the level of aggregations and the traffic, it is also desirable to have a switch fabric that can scale from gigabits per second (Gbps) to Tbps and can support effectively a widely ranging number, say tens to thousands, of ports. Further, the ability to support (a) quality of service (QoS) for a variety of services and applications and (b) various network protocols such as IP, ATM, and MPLS is highly desirable.

To that end, embodiments of the present invention are directed to a scalable multi-Tbps protocol-independent switch fabric architecture that meets such a challenge. The architecture is cost effective for building switches supporting wire-speed switching up to 1024 ports with capacity ranging from tens of Gbps to tens of Tbps and different QoS traffic classes. Scalability is achieved via self-routing of cells with a routing queue number scheme coupled with an efficient back-pressure and flow control. Arbitrarily high utilization of the crossbars can be achieved using an efficient output buffering and re-sequencing scheme.

In one embodiment, the present invention is a switch fabric for routing data from one or more sources towards one or more destinations, comprising a switching stage configured between an input stage and an output stage wherein the input stage is configured to receive the data transmitted from the one or more sources and forward the data to the switching stage; the switching stage is configured to route the data received from the input stage to the output stage; the output stage is configured to transmit the data received from the switching stage towards the one or more destinations; the input stage comprises a plurality of input devices, each input device performing a port expansion function; the switching stage comprises one or more crossbar devices, each crossbar device performing a data routing function; the output stage comprises a plurality of output devices, each output device performing a port contraction function; each input device transmits bids to the one or more crossbar devices to request connections through the switching stage for routing the data to the output devices; and each crossbar device comprises (1) a bid arbitrator configured to determine whether to accept or reject each received bid, wherein, in response to a collision between multiple bids, the bid arbitrator accepts two or more of the colliding bids in a single time slot; and (2) memory for storing one or more accepted cells for the same output device, wherein the crossbar device can transmit grant signals for two or more accepted bids for the same output device in a single time slot.

In another embodiment, the present invention is a switch fabric for routing data from one or more sources towards one or more destinations, comprising a switching stage configured between an input stage and an output stage wherein the input stage is configured to receive the data transmitted from the one or more sources and forward the data to the switching stage; the switching stage is configured to route the data received from the input stage to the output stage; the output stage is configured to transmit the data received from the switching stage towards the one or more destinations; the input stage transmits bids to the switching stage to request connections through the switching stage for routing the data to the output stage; and the switching stage comprises (1) a bid arbitrator configured to determine whether to accept or reject each bid; and (2) memory for storing one or more of the bids received from the input stage, wherein the bid arbitrator is configured to re-consider whether to accept a stored bid that was not accepted in a previous time slot.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 8 shows a block diagram of each crossbar device of FIG. 2, according to one embodiment of the present invention;

FIG. 9 shows a block diagram representing the interfaces supported by the crossbar device of FIG. 8;

FIG. 12 shows a block diagram illustrating the operation of the arbitration scheme for three-stage switch fabrics, such as those shown in FIGS. 2 and 3, according to one embodiment of the present invention;

FIGS. 13 and 14 show the data format of a bid, according to one embodiment of the present invention;

FIG. 21 shows pseudocode for one possible persistent bid/random arbitration scheme;

FIG. 22 shows pseudocode for flow control between the pending logic and the input device scheduler, according to one embodiment of the present invention;

DETAILED DESCRIPTION

Configurations

The present invention is directed to three-stage switch fabrics that are based on different configurations of three different types of devices: an input device, a crossbar device, and an output device. A particular configuration may involve multiple instances of each of these three different types of devices. Logically, for a particular three-stage switch fabric configuration, the one or more input devices form the input stage (also referred to as the $1^{st}$ stage) of switch fabric, the one or more crossbar devices form the switching stage (also referred to as the $2^{nd}$ or middle stage), and the one or more output devices form the output stage (also referred to as the $3^{rd}$ stage).

Each input device performs a user port expansion function to connect an associated set of one or more ingress line cards (also referred to as ingress traffic management (TM) ports) to all crossbar devices in the switching stage. Each crossbar device performs switching functions that connect any ingress TM port of any input device to any egress TM port of any output device. Each output device performs a user port contraction function to concentrate traffic from all crossbar devices and forward the traffic to an associated set of one or more egress line cards (i.e., egress TM ports). Those skilled in the art will understand that, in certain implementations, a particular line card may function as both an ingress TM port and an egress TM port.

Input, crossbar, and output devices can be configured together in different ways using different numbers of the different types of devices to achieve a wide range of switch fabric architectures having a wide range of switch capacities. For example, one type of scalable switch fabric architecture can be achieved by stacking together one or more instances of a basic switch fabric module, where each module comprises a single input device, a single crossbar device, and a single output device.

Figure 1:
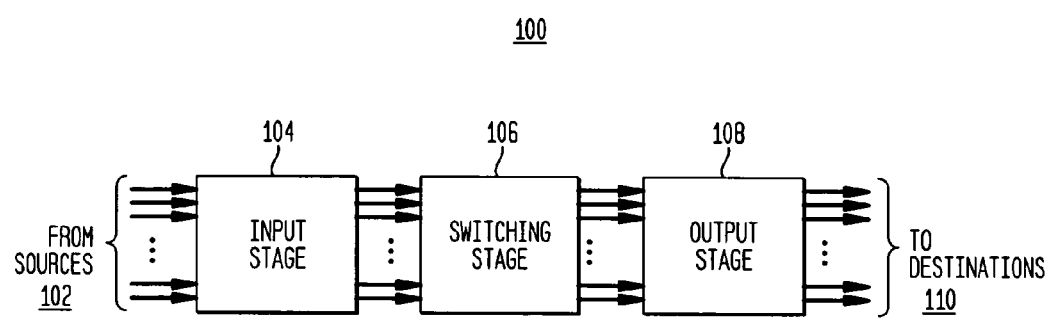
FIG. 1 shows a block diagram of a prior-art three-stage switch fabric for data communications.
Figure 2:
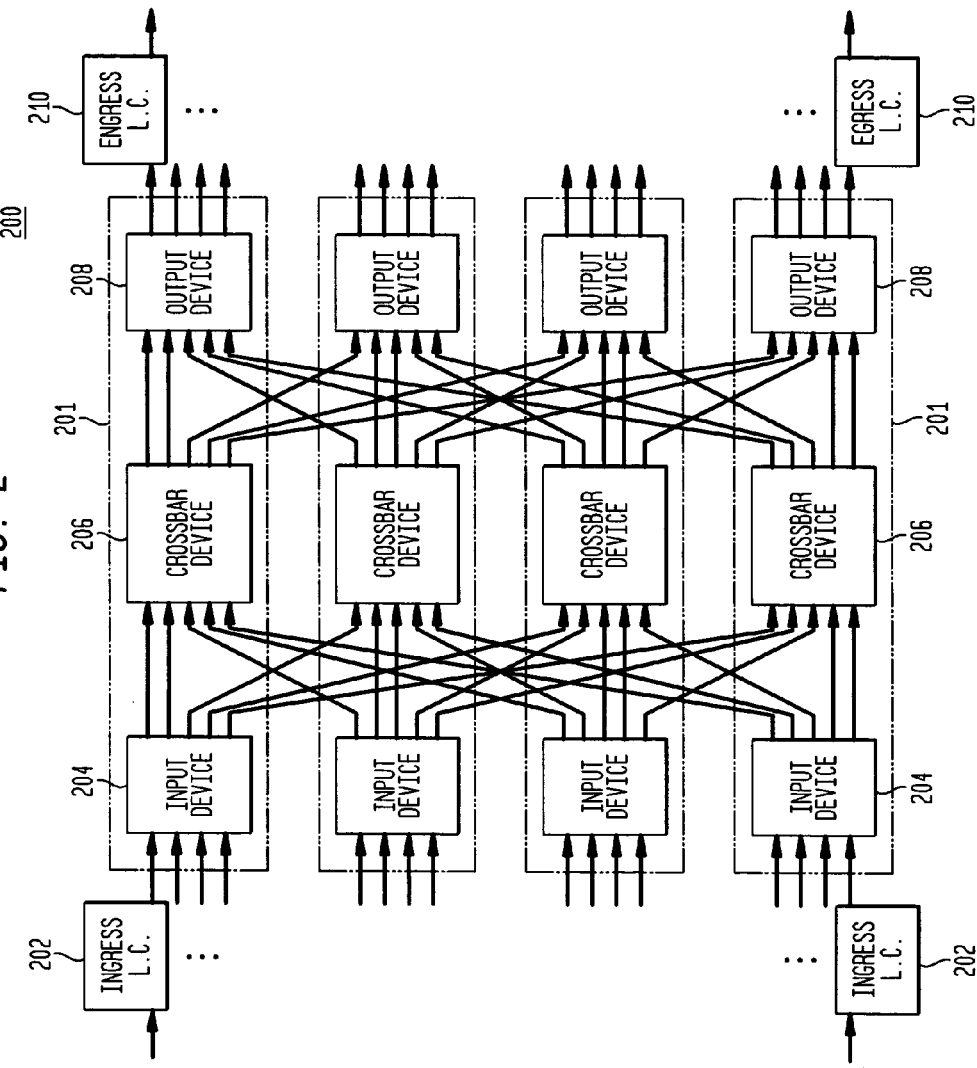
FIG. 2 shows a three-stage switch fabric of the present invention, in which four switch fabric modules are stacked, where each module comprises an input device, a crossbar device, and an output device.

FIG. 2 shows a three-stage switch fabric 200 of the present invention, in which four switch fabric modules 201 are stacked, where each module 201 comprises an input device 204, a crossbar device 206, and an output device 208. Logically, switch fabric 200 has three stages, where the four input devices 204 constitute the input stage of switch fabric 200, the four crossbar devices 206 constitute the switching stage of switch fabric 200, and the four output devices 208 constitute the output stage of switch fabric 200.

As shown in FIG. 2, each input device 204 connects a set of one or more ingress line cards 202 to each crossbar device 206. Analogously, each output device 208 connects each crossbar device 206 to a set of one or more egress line cards 210. In this way, switch fabric 200 can be configured as a non-blocking architecture in which data received from any ingress line card 202 associated with any input device 204 can in theory be routed through switch fabric 200 to any available egress line card 210 associated with any output device 208. Moreover, the data from any one particular ingress line card can in theory be routed to any particular egress line card through an available connection in any crossbar device 206.

Both input and output devices 204 and 208 have embedded memory as shared buffers. They aggregate 80 Gbps of user data and support user ports up to OC-768c rate. In particular, data is stored in memory that is organized as routing queues. The queuing structure ensures that there is no head-of-line blocking and provides traffic control such as buffer allocation and back-pressure. The switching stage is based on crossbar and has an arbitration logic that resolves port contentions.

For the scalable architecture of FIG. 2, fabric capacity grows incrementally as modules are added. For example, in one implementation of the present invention, each module 201 supports 40 Gbps of user traffic. As such, switch fabric 200 can support 4×40 or 160 Gbps of user traffic.

Figure 3:
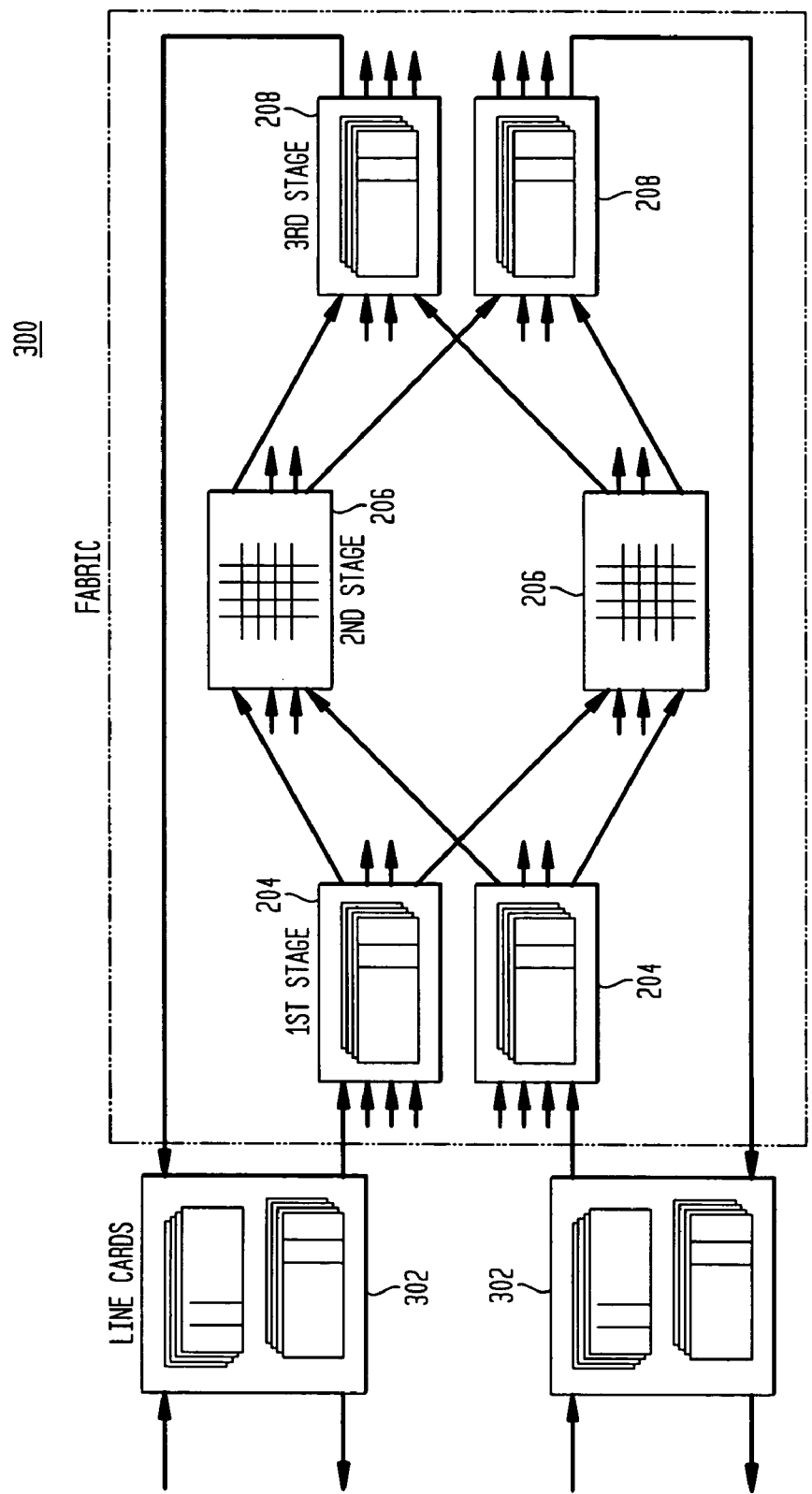
FIG. 3 shows an alternative configuration in which two input devices, two crossbar devices, and two output devices are configured as a basic three-stage switch using a centralized switch fabric configuration in which each line card functions as both an ingress and an egress traffic management port.

FIG. 3 shows an alternative configuration of devices in which two input devices 204, two crossbar devices 206, and two output devices 208 are configured as a basic three-stage switch 300 using a centralized switch fabric configuration in which each line card 302 functions as both an ingress and an egress TM port. Such a configuration may reduce the number of backplane connections over a comparable stacked configuration. Yet another possible configuration is a distributed fabric, in which an input device 204 and an output device 208 are used on each line card and the switching stage has an array of crossbar devices 206. Compared with comparable stacked fabric configurations, such as that shown in FIG. 2, the distributed fabric architecture may require fewer backplane connections and may be better suited for implementing switches having relatively large capacities.

In one implementation of the present invention, for every crossbar device 206 (up to 32) there can be up to two input devices 204 and two output devices 208 for a maximum (64×32×64) switch fabric configuration having a 5-Tbps switch capacity with 2:1 speed-up. Further upgrade for a maximum system capacity of 10 Tbps can be achieved by replacing the crossbar devices with high-capacity 256×256 crossbar elements. For this embodiment, the theoretical upper limit is 40 Tbps.

The fabric interface is preferably based on high-speed SERDES (serializer/de-serializer) technology, where each high-speed SERDES is embedded on chip. Both clock and synchronization are preferably embedded onto the data stream and recovered by integrated CDR (clock and data recovery) circuitry. The port rate is scalable from OC-12c/GbE rate to OC-768c rate. The high-speed serial signal I/O (input/output) can drive the backplane (or cables or optical transceivers directly) for inter-module and inter-shelf connectivity. This very high integration level and advanced system architecture provides a superb system solution for building very large scale switching or compact switching platforms. Further, the fabric interface supports multiple traffic classes and end-to-end flow control. Depending on the implementation, control information can be carried in-band or out-of-band or a combination of the two.

Input Device

Figure 4:
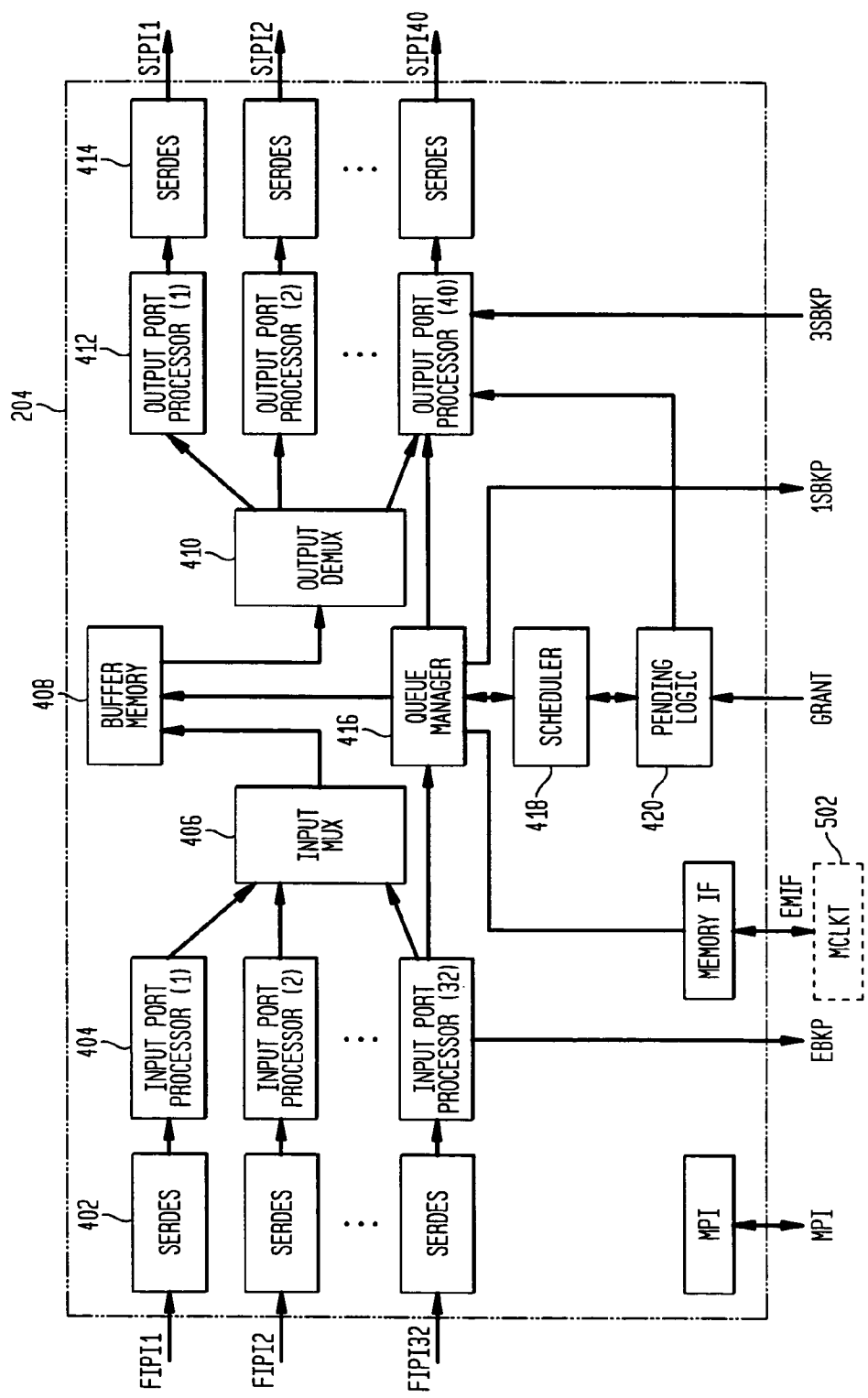
FIG. 4 shows a block diagram of each input device of FIG. 2, according to one embodiment of the present invention.

FIG. 4 shows a block diagram of each input device 204 of FIG. 2, according to one embodiment of the present invention. Input device 204 is a 32-port shared memory device. When configured in the input stage of a three-stage switch fabric configuration, such as that shown in FIG. 2, input device 204 provides data interfaces between one or more ingress TM ports and all of the crossbar devices in the switching stage.

Figure 5:
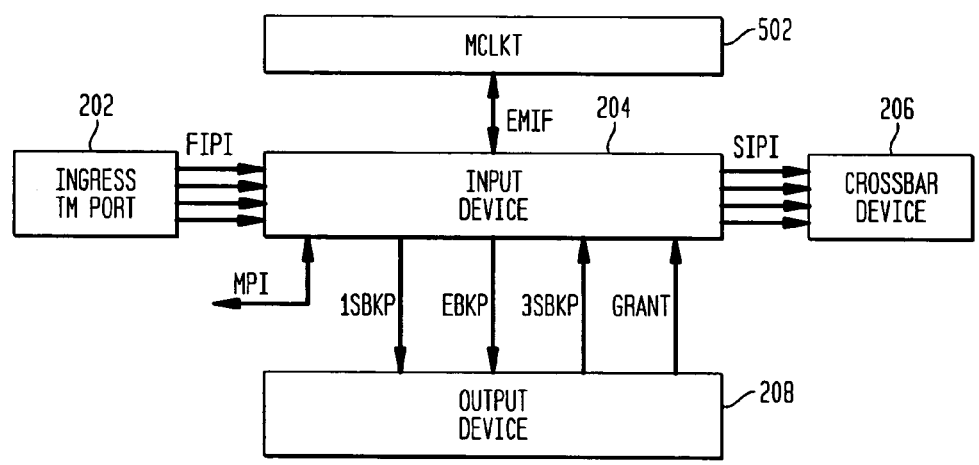
FIG. 5 shows a block diagram representing the interfaces supported by the input device of FIG. 4.

FIG. 5 shows a block diagram representing the interfaces supported by input device 204 of FIG. 4. In particular, input device 204 supports interfaces to one or more ingress line cards 202, one or more crossbar devices 206, a single corresponding output device 208, external memory 502 used to store a multicast look-up table (MCLKT), and an external processor (not shown). Not that, in preferred switch fabric configurations, each input device 204 is permanently logically associated (i.e., paired) with a different output device 208. It is this paired output device 208 that is shown in FIG. 5. This logical association is for flow control purposes and does not inhibit any input device from having user data routed to any output device.

In FIG. 5, FIPI represents the fabric input port interface between input device 204 and one or more ingress line cards. There are 32 FIPI inputs that can be connected to the ingress TM ports on the one or more ingress line cards. Multiple inputs can be logically grouped together to form a high-rate logical port. SIPI represents the switch input port interface between input device 204 and the switching stage. There are 40 SIPI outputs that can be connected to the crossbar devices in the switching stage.

The out-of-band interface between input device 204 and its corresponding output device 208 includes the $1^{st}$ stage back-pressure signal (1SBKP), the egress back-pressure signal (EBKP), the $3^{rd}$ stage back-pressure signal (3SBKP), and the grant signal (GRANT).

When the cell buffer memory in the input device is full, the 1SBKP signal needs to be sent to ingress TM port. This is achieved by sending the 1SBKP signal out-of-band to the paired output device 208 (as shown in FIG. 5), which in turn passes the 1SBKP signal (e.g., in-band) to the egress TM port that shares the same line card as the ingress TM port, where the egress TM port then passes the 1SBKP signal to the ingress TM port internal to the line card.

When an egress TM port interface buffer is full, the EBKP signal is generated and passed to the ingress TM port. The EBKP signal is embedded in the header of an ingress cell. The input device extracts the EBKP signal and passes it out-of-band to the corresponding output device (as shown in FIG. 5).

When the corresponding cell buffer memory in the output device is full, the 3SBKP signal is sent out-of-band to the input device (as shown in FIG. 5), which passes the 3SBKP signal to the crossbar devices.

The in-band GRANT signal from a crossbar device is extracted by the corresponding output device and passed out-of-band to the input device (as shown in FIG. 5).

EMIF represents the external memory interface between input device 204 and a multicast look-up table (MCLKT) stored in external memory 502. MPI represents the microprocessor interface via which control and status information is exchanged between the input device and an external processor.

Referring again to FIG. 4, cells are received on FIPI inputs. The serializer/deserializer (SERDES) 402 recovers the embedded clock from the data stream and converts the serial data stream to cells. The cells are then passed to the input port processors 404. Each input port processor aligns incoming cells to a common start-of-cell (SOC) reference and extracts cell headers. The egress back-pressure signal (EBKP) is extracted and placed onto the EBKP interface. Each input port processor also checks the cell bit interleave parity (BIP) field to verify the cell integrity. A corrupted cell is discarded and counted.

Cells from input ports are multiplexed at input mux 406 into a single cell stream and written to the cell buffer memory (BMEM) 408. The input mux also extracts routing information from the cell header and forwards it to the queue manager. Using this routing information, the queue manager supplies the write address of the cell to the BMEM.

The BMEM is a shared memory that is organized into a number of routing queues. The queue manager manages queues. For a unicast cell, the routing queue number and its traffic class determine to which queue the cell is admitted. For a multicast cell, it is always admitted to a dedicated multicast queue. The multicast tree structure is retrieved from the multicast look-up table (MCLKT) stored in external memory 502. The queue manager also performs the $1^{st}$ stage back-pressure threshold test function. When a queue exceeds its buffer allocation, an appropriate $1^{st}$ stage back-pressure signal is generated and placed onto the 1SBKP interface.

When a routing queue is back-logged, the scheduler 418 will allocate service to the queue. A service request (i.e., bid) is sent to pending logic 420. This request is then embedded into the header of a cell to be taken to the middle stage. (Note that the payload of this cell comprises user data corresponding to a previously granted bid.) The pending logic then waits to see if a bid is granted or rejected. If the request is granted, then a valid grant signal is expected from the GRANT interface. This grant signal is then fed to the pending logic which will initiate a real service for the corresponding bid.

A real service triggers a dequeue operation by the queue manager. One cell is read from the BMEM at a time. The BMEM read operations are performed by the queue manager and are scheduled so that every 40 cells from the BMEM will be de-multiplexed at output demux 410 to the 40 output port processors 412. The output demux converts a cell to the switch input port interface (SIPI) format. Switch requests and the $3^{rd}$ stage back-pressure signals are inserted into the cell header. The assembled cells are then forwarded to the appropriate output port processor, which buffers them and forwards them to the output SERDES. Each output SERDES 414 converts cells to a serial bit stream and drives output buffers.

Output Device

Figure 6:
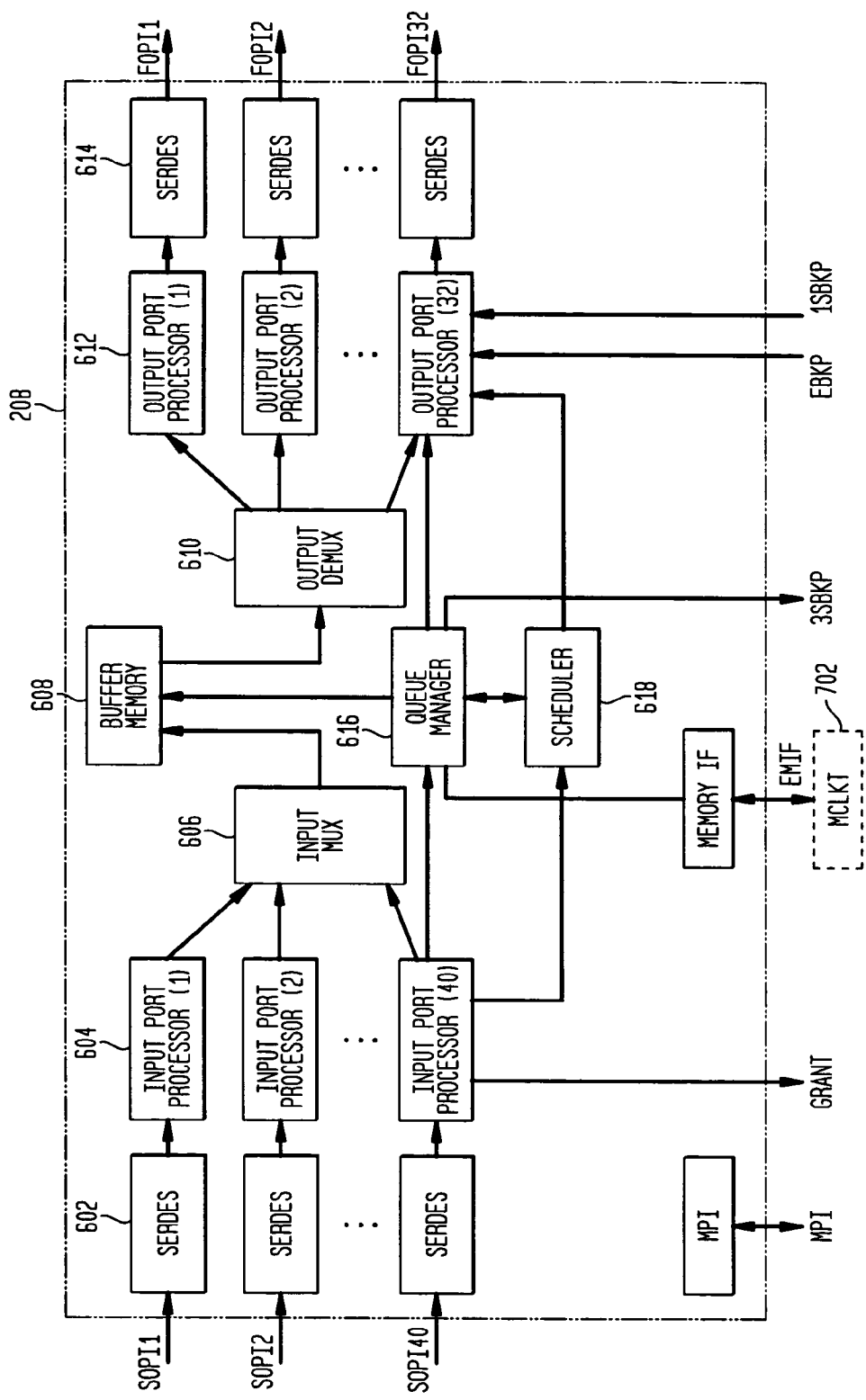
FIG. 6 shows a block diagram of each output device of FIG. 2, according to one embodiment of the present invention.

FIG. 6 shows a block diagram of each output device 208 of FIG. 2, according to one embodiment of the present invention. Output device 208 is a 32-port shared memory device. When configured in the output stage of a three-stage switch fabric configuration, such as that shown in FIG. 2, output device 208 provides data interfaces between all of the crossbar devices in the switching stage and one or more egress TM ports.

Figure 7:
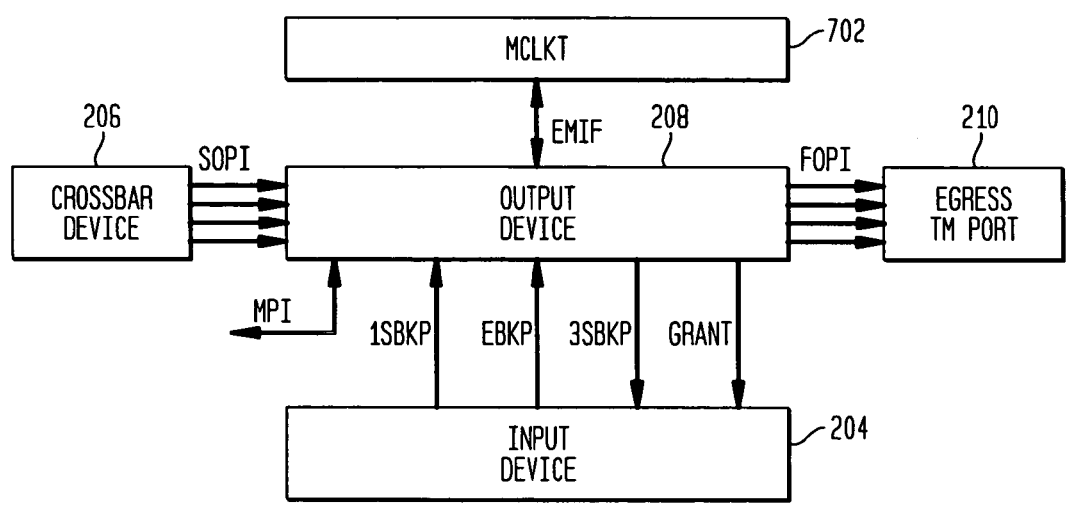
FIG. 7 shows a block diagram representing the interfaces supported by the output device of FIG. 6.

FIG. 7 shows a block diagram representing the interfaces supported by output device 208 of FIG. 6. In particular, output device 208 supports interfaces to one or more egress line cards 210, one or more crossbar devices 206, a single corresponding input device 204 (i.e., the paired input device for this output device), external memory 702 used to store a multicast look-up table (MCLKT), and an external processor (not shown).

In FIG. 7, SOPI represents the switch output port interface between output device 208 and one or more crossbar devices 206. There are 40 SOPI inputs that can be connected to crossbar devices in the switching stage. FOPI represents the fabric output port interface between output device 208 and one or more egress line cards. There are 32 FOPI outputs that can be connected to egress TM ports on the one or more egress line cards. Multiple outputs can be logically grouped to form a high-rate logical port.

The presence of 40 SIPI outputs in each input device 204 and 40 SOPI inputs in each output device 208 enables each input and output device to be configured to up to 40 different crossbar devices 206. This extra capacity can be used for improving performance and/or implementation of certain redundancy or fault protection schemes, depending on system design requirements.

The interface between output device 208 and its corresponding input device 204 includes the $1^{st}$ stage back-pressure signal (1SBKP), the egress back pressure signal (EBKP), the $3^{rd}$ stage back-pressure signal (3SBKP), and the grant signal (GRANT), which were described previously in the context of FIG. 5.

EMIF represents the external memory interface between output device 208 and the multicast look-up table (MCLKT) stored in external memory 702. MPI represents the microprocessor interface via which control and status information is exchanged between the output device and the external processor.

Referring again to FIG. 6, cells are received on SOPI inputs. The SERDES 602 recovers the embedded clock from the data stream and converts the serial data stream to cells. The cells are then passed to the input port processors 604. Each input port processor aligns incoming cells to a common reference SOC and extracts cell headers. The GRANT signal is extracted and placed onto the GRANT interface. Each input port processor also checks the cell BIP field to verify the cell integrity. A corrupted cell is discarded and counted.

Cells from input ports are multiplexed at input mux 606 into a single cell stream and written to the cell buffer memory (BMEM) 608. The input mux also extracts routing information from the cell header and forwards it to the queue manager. Using this routing information, the queue manager supplies the write address of the cell to the BMEM.

The BMEM is a shared memory that is organized to a number of routing queues. The queue manager manages queues. For a unicast cell, the routing queue number and its traffic class determine to which queue the cell is admitted. For a multicast cell, it is always admitted to a dedicated multicast queue. The multicast tree structure is retrieved from the multicast look-up table (MCLKT) stored in external memory 702. The queue manager also performs the $3^{rd}$ stage back-pressure threshold test function. When a queue exceeds its buffer allocation, an appropriate $3^{rd}$ stage back-pressure signal is generated on the 3SBKP interface.

When a routing queue is back-logged, the scheduler 618 will allocate service to the queue. A service results in a dequeue operation. One cell is read from the BMEM at a time. The BMEM read operations are performed by the queue manager and are scheduled so that every 32 cells from the BMEM will be de-multiplexed at output demux 610 to the 32 output port processors 612. The output demux converts a cell to the fabric output port interface (FOPI) format. The $1^{st}$ stage back-pressure signals are inserted into the cell headers. The assembled cells are then forwarded to the appropriate output port processor, which buffers them and forwards them to the output SERDES. Each output SERDES 614 converts cells to a serial bit stream and drives output buffers.

Crossbar Device

FIG. 8 shows a block diagram of each crossbar device 206 of FIG. 2, according to one embodiment of the present invention. Crossbar device 206 is a 64-port device. When configured in the switching stage of a three-stage switch fabric configuration, such as that shown in FIG. 2, crossbar device 206 provides data connections between all of the input devices in the input stage and all of the output devices in the output stage.

FIG. 9 shows a block diagram representing the interfaces supported by crossbar device 206 of FIG. 8. In particular, crossbar device 206 supports interfaces to one or more input devices 204, one or more output devices 208, and an external processor (not shown).

In FIG. 9, SIPI represents the switch input port interface between crossbar device 206 and one or more input devices 204. There are 64 SIPI inputs that can be connected to the input stage. SOPI represents the switch output port interface between crossbar device 206 and one or more output devices 208. There are 64 SOPI outputs that can be connected to the output stage.

MPI represents the microprocessor interface via which control and status information is exchanged between the crossbar device and the external processor.

Referring again to FIG. 8, SERDES blocks 802 and 814, input port processors 804, and output port processors 812 perform similar functions as the analogous elements in input device 204 of FIG. 4 and output device 208 of FIG. 6. Each input port processor separates fabric control information from the data stream. The $3^{rd}$ stage back-pressure signal 3SBKP is passed to the bid arbitration logic 820, which removes congested output devices from the arbitration operation. A successful request is allocated with a GRANT signal that is sent to the appropriate input device via its paired output device. The input port processors also forward the header field RQN (routing queue numbers) to a routing integrity check block 816, which compares RQNs with the crossbar configuration data. Any mismatched RQNs will be discarded and events counted.

The crossbar block 808 is of output mux type. It has an array of output multiplexors (not shown) that select input ports, where the output multiplexors are configured on a per cell basis. The configuration data is stored in configuration register 818 and loaded to the crossbar device at the cell slot clock rate. Multiple configuration register files are stored to match the request/grant latency and input processor pipeline operation.

The arbitration logic preferably performs a dual-priority arbitration function that resolves any collisions. All fabric ports are placed in a strict priority order. When a collision occurs, the highest priority port wins and its priority is degraded to the lowest. There are also two traffic priority levels. High-priority traffic always wins over low-priority traffic.

A crossbar device can be configured to different modes, e.g., from a single (64×64) matrix to 32 (2×2) matrices. A matrix configuration should match the system configuration. For example, in an 80-Gbps switch fabric configuration, one crossbar device may be used to connect two input devices and two output devices. In that case, the crossbar device should be configured as 32 (2×2) switches.

Fabric Speed-Up

In preferred embodiments, a switch fabric of the present invention is a cell-switching engine handling fixed-size switching cells. A switching cell has a header and a payload. The payload size is programmable (e.g., either 64, 72, or 80 octets), while the header size is fixed (e.g., 12 octets). The term "programmable" implies that, in this case, the particular payload size is selected when the switch fabric is initially configured. Once the switch fabric is configured, the payload size remains fixed for all subsequent switch fabric operations. The selection of the payload size depends on the application. A smaller payload size is best suited for traffic with a large volume of small packets. ATM switching is a good example of when to choose a small payload size (e.g., 64 octets). A larger payload size as a better bandwidth utilization when large packets make up a large percentage of traffic. The switching cell header contains information used only by the switch fabric.

Protocol independence is achieved by encapsulating user data packets into the payload of switching cells. This encapsulation function is provided by network processors on the line cards. When user data packets are larger than the switching cell size, the encapsulation function involves dividing each user data packet into two or more different switching cells.

When converting variable-sized packets into fixed-size switching cells, the "N+1" problem is well known (i.e., where the last fixed-size switching cell for a particular user data packet has only a single unit (e.g., one byte) of user data). Assuming that a payload size of N data units is chosen for the switch fabric, any packet with the size ranging from N+1 to 2N requires two switching cells. In order to mitigate this problem and to provide additional bandwidth for the switching cell headers, the fabric interface bandwidth is expanded by 2-to-1 and every fabric port can provide twice the bandwidth of a user port.

Programmable Queues

As described previously in the context of the three-stage switch fabric 200 of FIG. 2, each input device 204 in the input stage has a plurality of (e.g., 32) input ports that can be configured to ingress line cards to receive user data, and each output device 208 in the output stage has a plurality of (e.g., 32) output ports that can be configured to egress line cards to transmit user data. In addition, each input device 204 and each output device 208 has a plurality of (e.g., 1024) routing queues that can be used to temporarily store that user data. According to preferred embodiments of the present invention, the logical associations (a) between the input ports and the routing queues in each input device and (b) between the routing queues and the output ports in each output device are programmable, where the programmability depends on the particular switch fabric configuration (e.g., the numbers of input and output devices in the switch fabric and the numbers of input and output ports per device that are actually configured to line cards, where the number of configured ports can vary from device to device).

For example, in a (32×16×32) configuration having 32 input devices 204, 16 crossbar device 206, and 32 output devices 208, in which each input device had all 32 of its input ports configured to ingress line cards and each output device had all 32 of its output ports configured to egress line cards, there would be a total of 1024 configured output ports in the output stage (i.e., 32 output devices, each with 32 output ports configured to egress line cards). In that case, in order to provide a non-blocking switch fabric, each of the 1024 input routing queues in each input device would be logically associated with a different one of the 1024 output ports. In order to be able to reach any of the 1024 output ports, each of the input ports in each input device would be able to store user data to any of the 1024 input routing queues of that input device.

As another example, in a (32×16×32) configuration in which each input device had only 16 of its input ports configured to ingress line cards and each output device had only 16 of its output ports configured to egress line cards, there would be a total of 512 configured output ports in the output stage (i.e., 32 output devices, each with only 16 output ports configured to egress line cards). In that case, a different pair of the 1024 input routing queues in each input device could be logically associated with a different one of the 512 configured output ports, while still providing a non-blocking switch fabric. Since there could now be two different input routing queues for each configured output port, according to the present invention, the logical associations between the 16 configured input ports (e.g., "Input Port 1" to "Input Port 16") and the 512 pairs of input routing queues of each input device can be programmed when the switch fabric is configured. For example, in a particular input device, for a particular pair of input routing queues (e.g., "Queue A" and "Queue B") associated with a particular one of the 512 configured output ports (e.g., "Output Port I"), a first subset of the 16 configured input ports (e.g., Input Ports 1–10) could be programmed to store all of their user data destined for Output Port I into Queue A, while a second subset of the 16 configured input ports (e.g., Input Ports 11–16) could be programmed to store all of their user data destined for Output Port I into Queue B. Alternatively, the 16 configured input ports could be programmed to store one set of user data destined for Output Port I into Queue A and to store another set of user data destined for Output Port I into Queue B, thereby doubling the number of user traffic classes.

As yet another example, in a (4×2×4) configuration in which each input device had only 16 of its input ports configured to ingress line cards and each output device had only 16 of its output ports configured to egress line cards, there would be a total of 64 configured output ports in the output stage (i.e., 4 output devices, each with 16 output ports configured to egress line cards). In that case, a different set of 16 of the 1024 input routing queues in each input device could be logically associated with a different one of the 64 configured output ports, while still providing a non-blocking switch fabric. Since there could now be as many as 16 different input routing queues for each configured output port, according to the present invention, the logical associations between the 16 configured input ports (e.g., "Input Port 1" to "Input Port 16") and the 64 sets of input routing queues of each input device can be programmed when the switch fabric is configured. For example, Input Port 1 could be programmed to write to Queues A and B (e.g., depending on the priority of its user data), Input Port 2 could be programmed to write to only Queue B, Input Port 3 could be programmed to write to Queues A and C, etc. Those skilled in the art will understand that there is great variability in how these different logical associations could be programmed, including different combinations involving individual input ports being able to store data into two or more different input routing queues and two or more input ports being able to store data into a single input routing queue.

In general, when a three-stage switch fabric of the present invention is initially configured, each input port in each input device can be programmed to be logically associated with one or more routing queues in that input device, where the one or more routing queues are selected from a group of routing queues whose number is dictated by the number of input ports of that input device that are configured to ingress line cards and the total number of configured output ports in the output stage of the switch fabric.

Similarly, when the switch fabric is initially configured, each output port in each output device can be programmed to be logically associated with one or more routing queues in that output device, where the one or more routing queues are selected from a group of routing queues whose number is dictated by the number of output ports of that output device that are configured to egress line cards and the total number of configured input ports in the input stage of the switch fabric. The programmability of the logical association between output ports and routing queues in output devices is analogous to that for the input devices.

For a given configuration, the mapping between routing queues in the input devices and routing queues in the output devices is determined based on the logical associations (a) between the input ports and the routing queues in the input devices and (b) between the output ports and the routing queues in the output devices.

The programming of one input port of an input device is independent of the programming of the other input ports of that input device. Similarly, the programming of the input ports of one input device in an input stage is independent of the programming of the input ports of the other input devices in the input stage. Analogous independence exists for the programming of the output ports of the output devices in the output stage.

This ability to program the logical associations between ports and queues in the input and output devices increases the flexibility provided by switch fabric architectures of the present invention. As described earlier, the programmability enables two or more inputs to be logically grouped together to form a high-rate logical input port. Similarly, the programmability enables two or more outputs at an output device to be logically grouped together to form a high-rate logical output port.

When an input port is associated with two or more different routing queues in an input device, different sets of user data received at that input port can be separated and stored in different routing queues. This allows the different sets of user data from the same source to be treated differently, for example, based on their different destinations and/or to provide different treatment for different quality-of-service (QoS) levels and/or to achieve isolation. For example, if different types of user data are stored in different routing queues and one of the routing queues is full, then isolation can be achieved by sending back-pressure information to the source to stop sending the corresponding type of user data, while allowing the other types of user data to continue to be transmitted from that source for storage in the other routing queues associated with that same input port.

Servicing of (i.e., data removal from) those multiple routing queues in both the input and output devices (as controlled by the schedulers in those devices) is preferably sequenced in order to preserve the order in which the user data arrived at the switch fabric.

Queue Structure, QoS Schedulers, and Cell Routing

The switch fabric of the present invention provides a unique queuing structure that supports advanced traffic management features such as end-to-end quality of service (QoS), traffic isolation, and fair use of the system bandwidth. The queuing structure supports a large number of routing queues within the fabric that can be organized, according to the system configuration, to provide simple VOQ (virtual output queue) implementation or input/output pair queuing (IOPQ). For scalability, a routing queue numbering scheme is used instead of a port bitmap. Further, there are two sub-queues per routing queue for scheduling purposes. Delay-sensitive traffic can be switched with highest priority to minimize the latency. Additionally, virtual time-division multiplexing (TDM) pipes can be set up between ports to provide guaranteed bandwidth and minimize the delay variation. Work conserving fair queuing scheduling allocates bandwidth for the best-effort traffic that is treated with low priority through the switch fabric.

Figure 10:
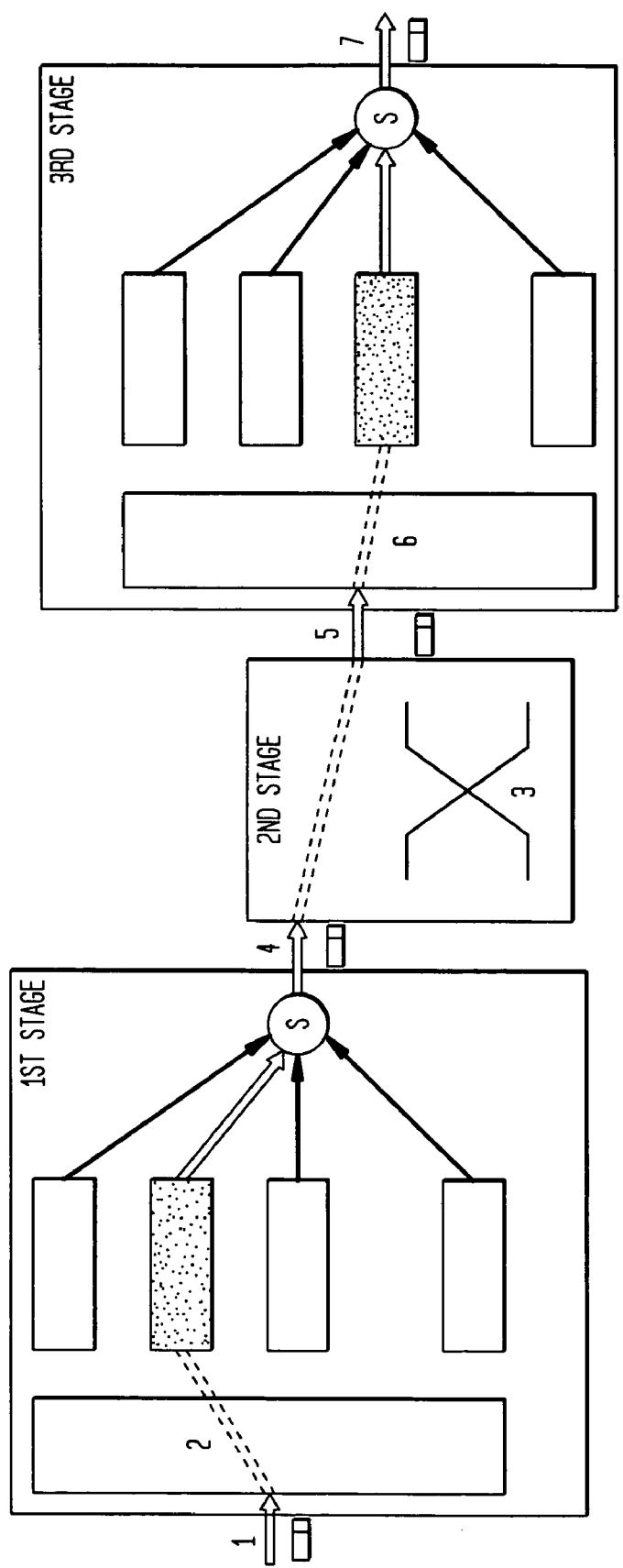
FIG. 10 illustrates the self-routing mechanism for unicast cell routing used in preferred embodiments of the present invention.

FIG. 10 illustrates the self-routing mechanism for unicast cell routing used in preferred embodiments of the present invention. Initially, while in the ingress line card, a cell is assigned a destination fabric port number before entering the switch fabric. The cell is then sent to the input device (Step 1 in FIG. 10). Based on the destination port number and priority, the cell is placed in the appropriate routing first-in/first-out (FIFO) queue in the input device (Step 2). Once the scheduler considers the cell as eligible for service and the routing queue can be served, a bid is sent to one of the crossbar devices (Step 3). If the bid is rejected, then a bid is re-sent according to an algorithm that takes into account the cell priority. If the bid is accepted, a valid grant signal is sent back to the input device and the cell is sent to the crossbar device (Step 4). Based on the destination address, the crossbar device transfers the cell to the link connected to the output device containing the destination port (Step 5). Upon arrival at the output device, the cell is placed in one of the queues associated with the destination port (Step 6). Once the scheduler in the output device considers the cell as eligible for service and the routing queue can be served, the cell is sent to the destination port (Step 7). No per connection setup is needed in the fabric.

Figure 11:
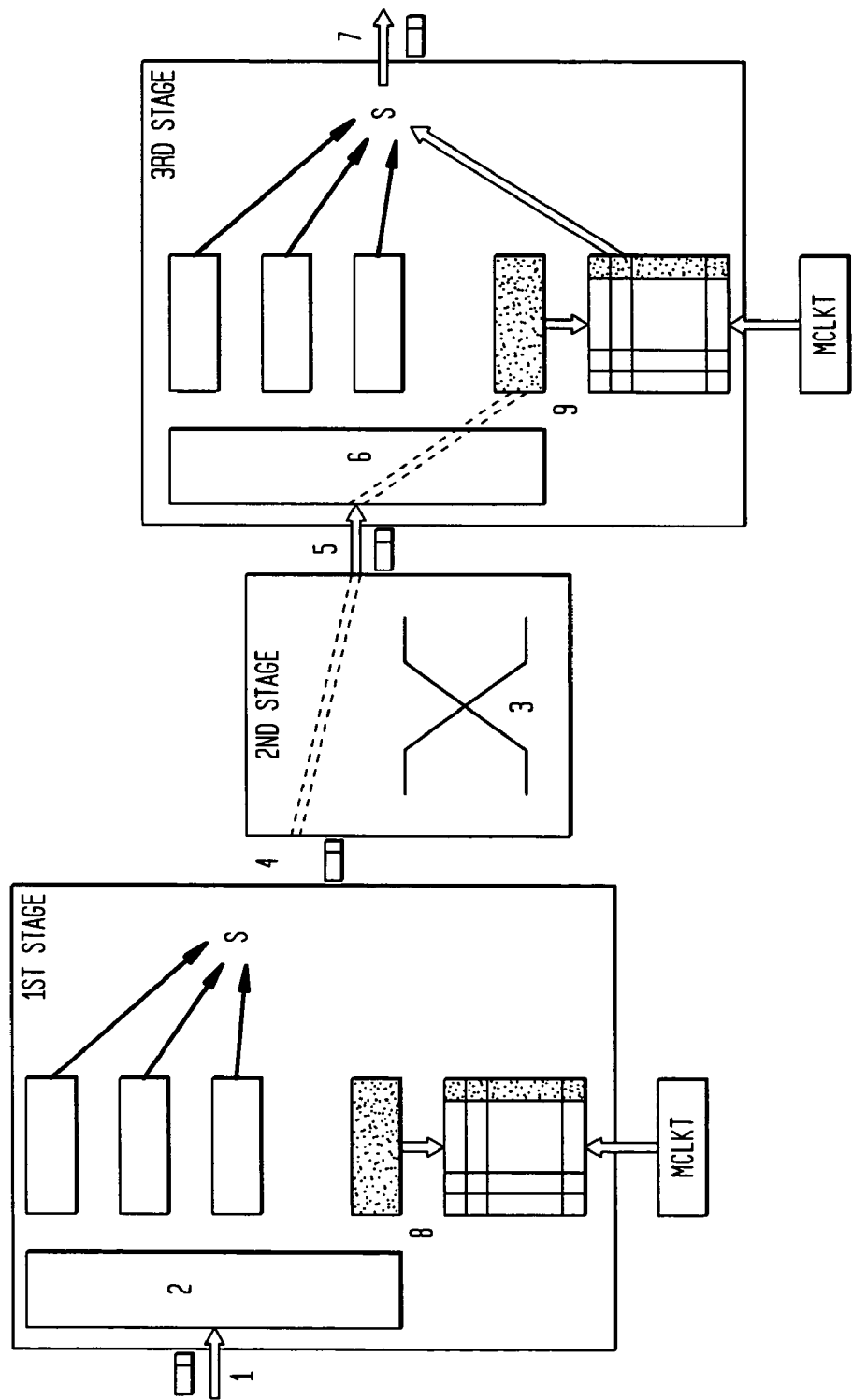
FIG. 11 illustrates the self-routing mechanism for multicast cell routing used in preferred embodiments of the present invention.

FIG. 11 illustrates the self-routing mechanism for multicast cell routing used in preferred embodiments of the present invention. In order to achieve high buffer efficiency, cell data are preferably duplicated only at the latest possible moment in the switch fabric. In particular, data duplication can be performed either (i) at the input device (Step 8 in FIG. 11) when two or more of the destination ports are in different output devices and/or (ii) at the output device (Step 9 in FIG. 11) when two or more of the destination ports are in the same output device. A multicast header carries a multicast group identifier. Multicast cells are stored in a separate multicast queue. The identifier is used for a multicast look-up process that retrieves the multicast tree structure. Since such operations need to be carried out at extremely high speed, a caching method involves the multicast tree structure being retrieved from either an internal or an external look-up memory (MCLKT) and loaded to an on-chip cache memory. Each multicast branch can then be scheduled independently.

Bid and Arbitration Mechanism

The bid and arbitration mechanism is responsible for requesting slots to transmit cells from the input devices to the output devices and resolving any collisions in the crossbar devices. In a configuration in which there is only one link from each crossbar device to each output device, a collision refers to a situation in which two or more input devices transmit bids (i.e., service requests) to the same crossbar device during the same time slot (also referred to as a cell slot) to request connections to the same output device. For configurations in which two or more links connect a particular crossbar device to a particular output device, a collision will occur when the number of bids received by that crossbar device for that output device during the same time slot is greater than the number of links between that crossbar device and that output device.

FIG. 12 shows a block diagram illustrating the operation of the arbitration scheme for three-stage switch fabrics, such as those shown in FIGS. 2 and 3, according to one embodiment of the present invention. Referring to the steps identified in FIG. 12, the operation of this arbitration scheme is as follows:

(1) The scheduler in an input device 204 makes a scheduling decision every clock cycle that is passed to the pending logic in that input device.
(2) The pending logic in the input device transmits one bid to each of the crossbar devices (206) in each cell slot, where there are a specific number (e.g., 32 or 40) of clock cycles for each cell slot.
(3) In each crossbar device, the bid arbitrator determines whether to accept or reject each received bid, resolving any collisions with other bids received from other input devices.
(4) The crossbar device transmits a grant/rejection signal to the requesting input device through the appropriate output device 208i and, if the bid was accepted, the crossbar device is configured to establish a connection at the appropriate time. Note that the appropriate output device for this step is the output device that is paired with the input device that transmitted the bid, which output device might be—but does not have to be—the destination output device (208j) for user data.
(5) The output device 208i receives the grant/rejection signal from the crossbar device and passes that signal back to the input device through an out-of-band channel.
(6) The grant/rejection signal received at the requesting input device is passed to the pending logic.
(7) If the bid was granted, then the cell is dequeued and transmitted to the crossbar device.
(8) The cell is switched through the crossbar device.
(9) The cell arrives at the destination output device 208j and is scheduled for transmission via the appropriate egress port. Note, again, that the paired output device 208i of Step (5) may be but need not be the same output device as the destination output device 208j of Step (9).

Latencies are introduced during the arbitration operation of FIG. 12 at various stages. These operational latencies are deterministic and used to ensure synchronization. For example, the crossbar device uses these known latencies to ensure that the appropriate connection is established at the appropriate time (i.e., a known duration after receipt and arbitration of the corresponding bid) to route the appropriate cell to the desired destination port.

Input Device Randomizer

In the embodiment of FIG. 2, each input device 204 can be configured with up to 40 connection links to the switching stage. As such, up to 40 bids can be transmitted from each input device to the switching stage simultaneously (during the same time slot). The distribution of bids over the links is controlled by a pseudo-random number (PRN) generator implemented in the input device. The PRN generator generates pseudo-random integer numbers evenly distributed within a range that is based on the number of links between the input device and the switching stage.

For example, if each input device is configured with 32 connection links to the switching stage (e.g., one per crossbar device in a (64×32×64) configuration), then, for every 32 bids, the PRN generator generates a different pseudo-random number (PRN) in the range from 1 to 32. The number PRN is then used to map the 32 different bids to the 32 different connection links. For example, in one implementation, the number PRN is the link number for Bid 1 (i.e., the first of the 32 bids), the number PRN+1 is the link number for Bid 2, etc., in a circular manner where link number 1 follows link number 32 for PRN values other than 1. Since there is latency between a bid and its corresponding grant signal, a grant for a bid is expected on the middle stage output link corresponding to the same middle stage input link on which the bid was sent. To match the bid/grant sequence, the input device remembers the sequence of PRNs generated by the PRN generator. When the input stage has multiple input devices, different PRN seeds should be loaded into the PRN generators of the different input devices to avoid undesirable synchronization between those PRN generators.

Bid Data Format

Bids are inserted into the headers of cells transmitted from the input device to the crossbar devices. (Note that, since bids are for future routing of cells, the payload of each cell carrying a bid corresponds to earlier transmitted and granted bid.) In the embodiment of FIG. 2, each crossbar device 206 receives up to 64 bids in each time slot.

FIGS. 13 and 14 show the data format of a bid, according to one embodiment of the present invention. An idle bid (i.e., IDLEBID=0) is discarded. The bid channel BIDCH, which is extracted directly from the cell header, identifies the priority channel of the request. In FIG. 14, GBW stands for "guaranteed bandwidth" and BE stands for "best effort." GBW data has a higher priority than BE data.

Both the requested $3^{rd}$ stage device (RDESTD) and the requested $3^{rd}$ stage port (RDESTP) are directly extracted from the requested destination field REQDEST of the cell header. REQDEST is decomposed to RDESTD and RDESTP using the configured format. RDESTD and RDESTP are checked against global parameters MAXDEVICE and MAXPORT, respectively. If a range violation is detected, the request is rejected. The $3^{rd}$ stage routing queue number R3QN is extracted from the requested routing queue number field REQRQN of the cell header. RSRCD indicates the input device that originated the request. It is derived from the input port number and used for priority selection and for arbitration.

$3^{rd}$ Stage Back-Pressure Test

In preferred implementations, the bid arbitrator in each crossbar device takes into account the $3^{rd}$ stage back-pressure status. A congested output device is removed from the arbitration because a cell cannot be sent to the congested output device. Each crossbar device maintains a $3^{rd}$ stage back-pressure status table. Before arbitration is performed, a valid bid is examined against the back-pressure status. There are separate back-pressure status tables for unicast and multicast transmissions.

Figure 15:
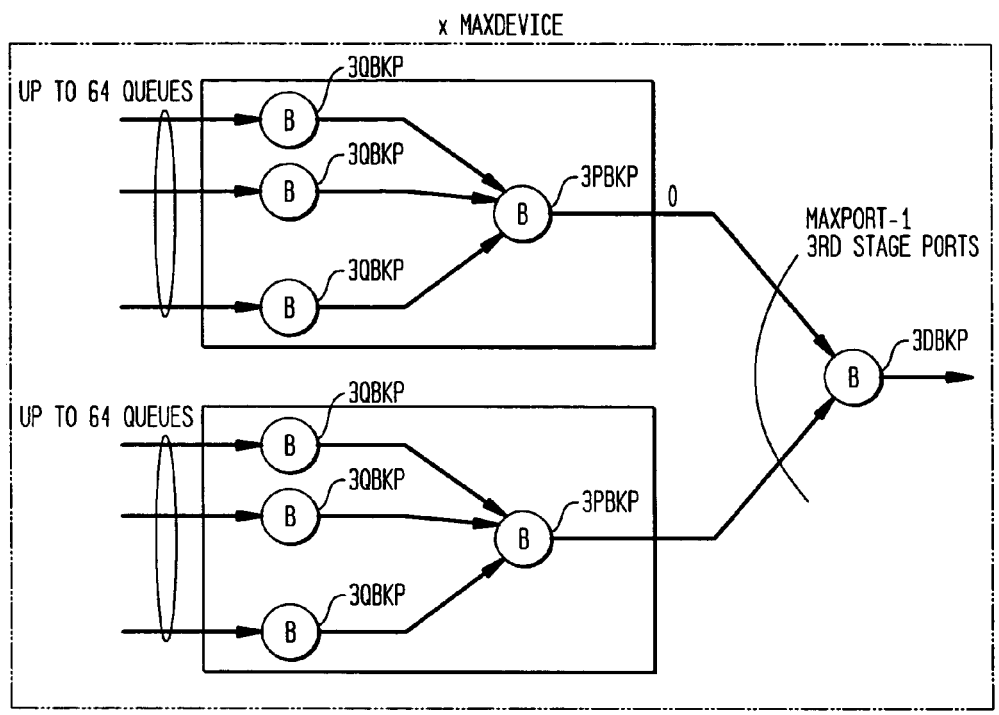
FIG. 15 shows the preferred back-pressure structure for one priority level.

The unicast back-pressure status is organized in three levels: per output device, per destination fabric port, and per queue. Every level of back-pressure is further divided into two priorities. FIG. 15 shows the back-pressure structure for one priority level.

The $3^{rd}$ stage back-pressure is selective. When a $3^{rd}$ stage buffer queue is congested, only the traffic that is destined to the congested queue is back-pressured, while traffic that is destined to other queues and ports in the same output device may still go through the fabric.

The first level of the back-pressure is the $3^{rd}$ stage device level back-pressure 3DBKP. This level controls the traffic to an output device. An output device is back-pressured if its buffer memory is full. The second level of the back-pressure is the $3^{rd}$ stage port back-pressure 3PBKP. This level controls the traffic to an output device port. An output device port is back-pressured if the buffer memory allocation for the port is used up. The third level of the back-pressure is the $3^{rd}$ stage routing queue level back-pressured 3QBKP. This level controls the traffic to an output device routing queue. When a queue fill level reaches its back-pressure level, traffic sources (e.g., $1^{st}$ stage queues, ports, or devices) are stopped.

Figure 16:
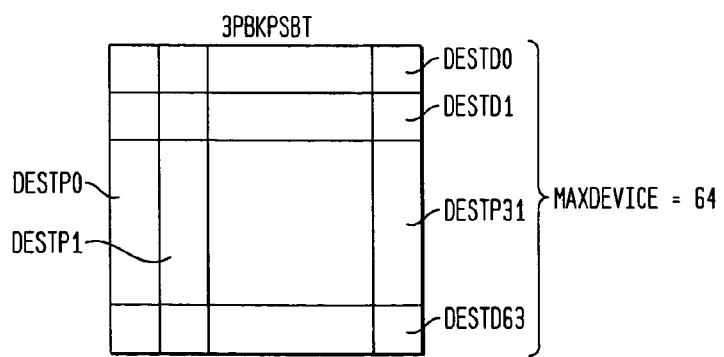
FIG. 16 shows the back-pressure table 3PBKPSBT maintained by each crossbar device.

FIG. 16 shows the back-pressure table 3PBKPSBT maintained by each crossbar device. The port-level table 3PBKPSBT has up to 64 entries, one for each output device. Each entry has 32 bits, one for each output port. The table entry is updated by the $3^{rd}$ stage port back-pressure signals 3PBKP. The size of this table is 64×32=2048 bits. There are two 3PBKPSBT tables, one for each priority.

For a unicast request (BIDCH=0/1), the back-pressure test is as follows:

Use RDESTD as an index to the 3PBKPSBT table to retrieve the port status bitmap;

If 3PBKPSBT[RDESTD, RDESTP]=1, then the request is rejected due to port back-pressure;

Otherwise, the request passes the $3^{rd}$ stage back-pressure test.

Figure 17:
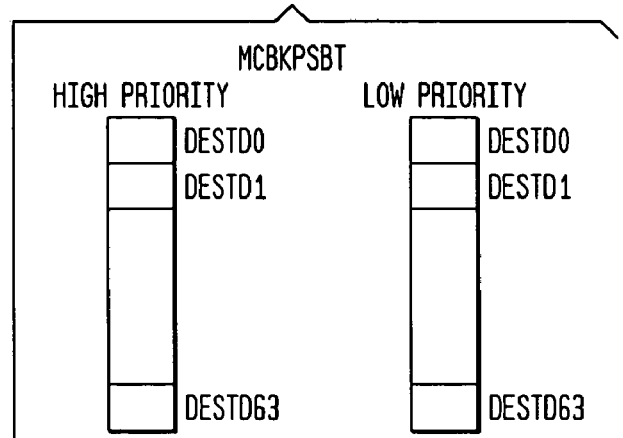
FIG. 17 shows the multicast back-pressure status table MCBKPSBT organized as a one-dimensional table.

For multicast requests, an output device has a single multicast queue shared by all ports. There is a single level multicast back-pressure control on the per output device basis. The multicast back-pressure status table MCBKPSBT is organized as a one-dimensional table, as shown in FIG. 17. There are two MCBKPSBT tables, one for each priority. For a multicast request (BIDCH=2/3), the back-pressure test is as follows:

If MCBKPSBT[RDESTD]=1, then the request is rejected due to multicast queue back-pressure in the output device;

Otherwise, the request passes the $3^{rd}$ stage back-pressure test.

In one possible implementation, both the per queue and the per port back-pressure information are used in the input stage. In another possible implementation, only the per queue back-pressure information is used in the input stage, while the per port back-pressure information is used in the switching stage.

Crossbar Contention and Arbitration Algorithms

While the number of links between the input stage and the output stage gives the total bandwidth internal to the fabric devices, the actual user data throughput depends on the traffic distribution and the applied contention/arbitration algorithm.

Random Bid/Random Arbitration

Figure 18A:
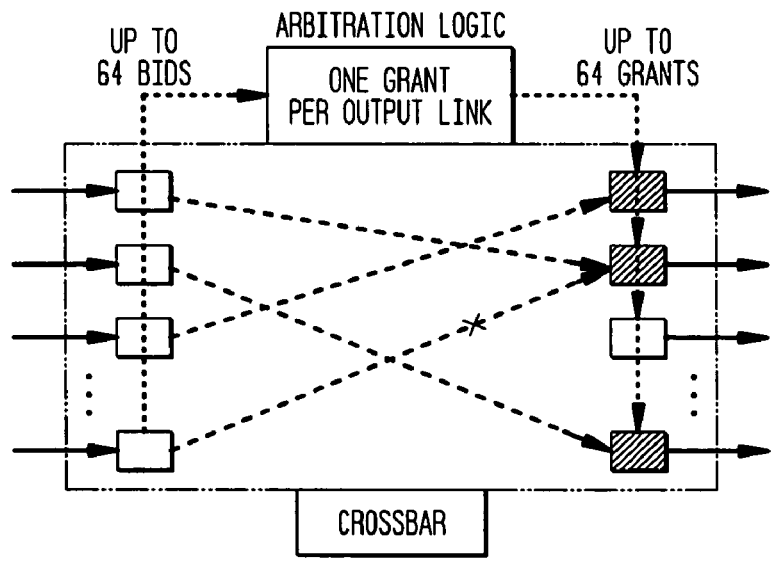
FIGS. 18a and 18b illustrate an independent and random bid/random arbitration scheme whereby each input device would send as many requests (bids) as the number of crossbar devices.
Figure 18B:
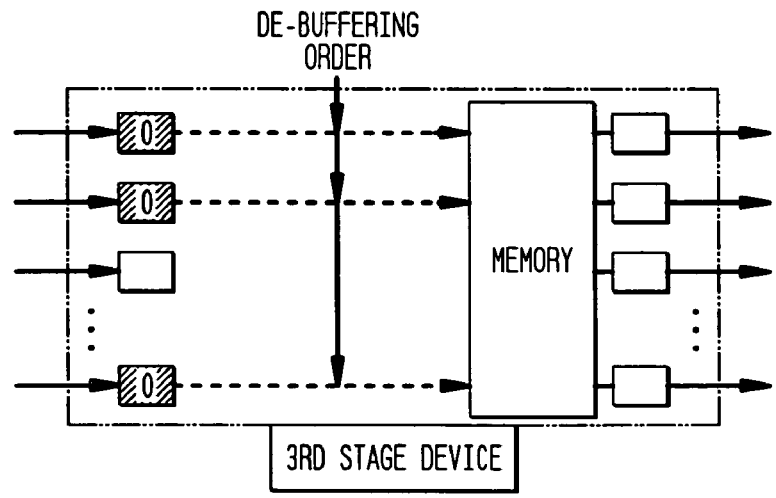

FIGS. 18a and 18b illustrate an independent and random bid/random arbitration scheme whereby each input device would send as many requests (bids) as the number of crossbar devices. The bids are sent simultaneously with random distribution. Each of the crossbar devices would grant bids to the input devices by priority and randomly, if there is a contention for the same output link of an output device. FIG. 18a illustrates this crossbar device architecture.

The arbitration scheme of FIGS. 18a and 18b relies on a dual-priority algorithm. The first priority selection is based on the traffic class. In one implementation, two classes are supported in strict priority order. The high-priority class arbitration result always overrides the low-priority class arbitration result. The second priority selection is based on the output device. For every arbitration cycle, if collision occurs, one of the contending input devices is randomly selected as the winner.

Figure 19:
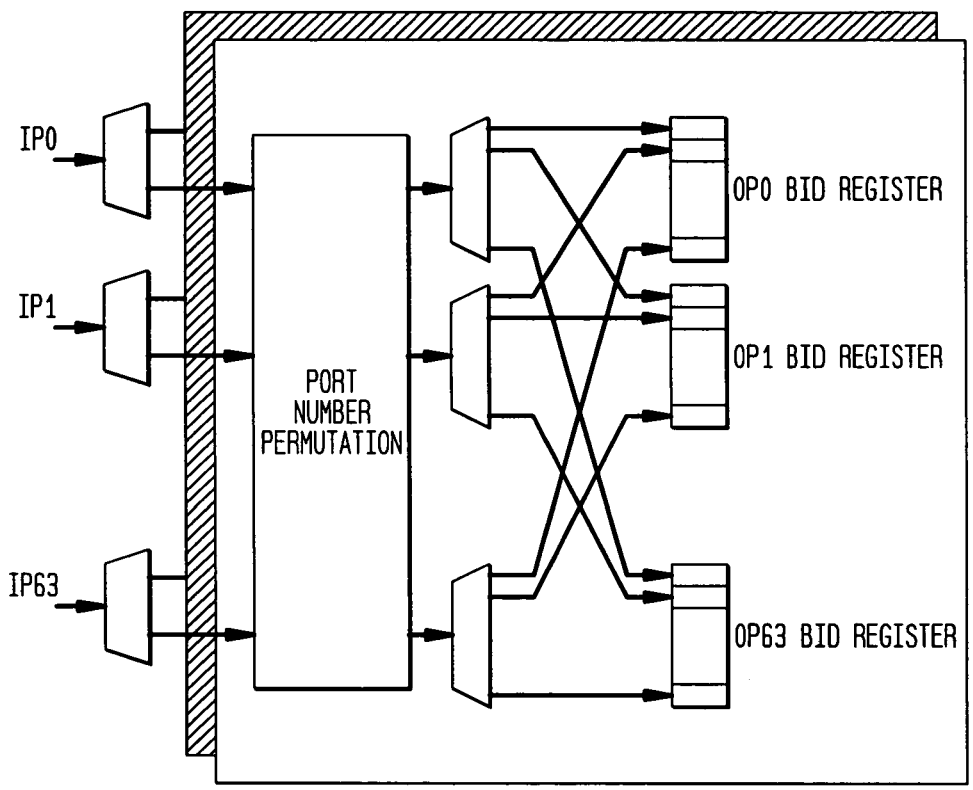
FIG. 19 shows, how sorted bids are stored in bid registers that are organized per output device within each crossbar device.

Bids are first sorted according to their traffic class. They are then sorted according to the requested output devices. Within each crossbar device, the sorted bids are stored in bid registers that are organized per output device, as shown in FIG. 19. Each bid register has 64 bits that record bids from all 64 input devices. If back-pressure is asserted, then the corresponding bids are reset so that they do not participate in the arbitration. If there is one bid in a register, then the corresponding input device wins the arbitration (i.e., its bid is granted). If there is more than one bid found in the register, then one of the corresponding input devices is randomly selected as the winner.

Figure 20:
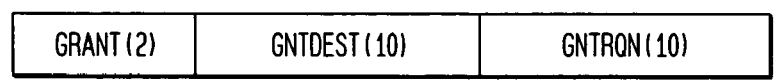
FIG. 20 shows the data format of each grant/rejection signal.

The results from the bid arbitration (i.e., the grant/rejection signals) are sent from each crossbar device to the appropriate input devices via the output devices that are paired with those input devices. FIG. 20 shows the data format of each grant/rejection signal. The 2-bit GRANT field indicates the result of the arbitration as follows:

(00) implies that the bid is granted;
(01) implies that the bid is denied due to port contention;
(10) implies that the bid is denied due to back-pressure; and
(11) implies that the bid is denied due to an invalid bid.

Both the requested fabric port number (REQDEST) and the queue number (R3QN) are returned to the input device as GNTDEST and GNTRQN, respectively, for use in performing an integrity check. For an invalid bid, GNTDEST and GNTRQN are un-specified.

In the maximum 64×32×64 architecture (i.e., a switch fabric having 64 input devices, 32 crossbar devices, and 64 output devices), at each time slot, each input device sends up to 32 bids, no more than one to each of the 32 different crossbar devices, to contend for the cross-connects in those crossbar devices. These 32 requests are essentially randomly distributed over the 32 crossbar devices. At each time slot, each crossbar device arbitrates over its (up to 64) received bids, which includes at most one bid from each input device, to determine which bids to grant (accept) and which bids to deny (reject). The grant/deny decisions are encoded in the headers of cells transmitted back to the corresponding input devices. The bid arbitration processing performed by each crossbar device follows the rules that, for each requested output device, (1) if the destination port and/or the destination queue is back-pressured, then the bid is rejected, (2) contending bids with lower priority (e.g., GBW class) are rejected in favor of those with higher priority (e.g., EBS (excessive bandwidth scheduler) class), and (3) for each output device, one of the remaining bids (necessarily of the same priority) is randomly chosen (for fairness) to be granted. In effect, this random/random scheme approximates the random bids where the requests from the input devices are randomized from each other.

Note that, since a particular input device can send several cells belonging to one flow in one cell slot (via different crossbar devices), the issue of keeping the flow cell sequence throughout the switch fabric is addressed by allocating the cells from the same input device queue to crossbar devices (that accepted the bids from this queue) in prescribed order in each cell slot. Namely, if there is more than one cell from a given queue to be sent in a given cell slot, the first cell from the queue is allocated to the eligible crossbar device with the lowest index, the next cell is allocated to the eligible crossbar device with the second lowest index, etc. Then, in the output device, the cells arriving in a given cell slot from the crossbar devices are transferred into the cell memory following the crossbar index order as illustrated in FIG. 18b. This mechanism ensures that the flow cell sequence is flat.

The worst case of the maximum throughput occurs when the crossbar device is subject to symmetric uniform traffic. In that case, the maximum throughput $U_{max}$ of the crossbar device is given by Equation (1) as follows:

$$U_{max}=1-(1-1/M)^M \qquad (1)$$

where M is the number of input devices, where throughput corresponds to the fraction of bids that are accepted. For other distributions, capacity bounds can also be derived. Note that, for large M (e.g., 64), the worst-case maximum utilization is about 63.5%. With the 2-to-1 speed-up at the fabric interfaces, this may or may not be sufficient to match the line rate at the port card, depending on the application and packet size distribution. There are a number of ways of improving the data throughput. One way is to limit the aggregate traffic bandwidth per device or increase the number of links between the stages. Another approach is to improve upon the bid and arbitration scheme and the architecture to achieve a higher efficiency.

Persistent Bid/Random Arbitration

One alternative bid/arbitration scheme is based on a persistent bid/random arbitration approach. FIG. 21 shows pseudocode for one possible persistent bid/random arbitration scheme. According to this scheme, the crossbar devices perform the same random arbitration processing as in the random/random scheme, while the input devices apply persistent bid processing. According to one implementation of persistent bid processing, when a bid from an input device is rejected due to collision rather than back-pressure, the input device will send another bid (either to the same crossbar device or a different crossbar device) for the same output device. Otherwise, the input device will transmit a bid (either to the same crossbar device or a different crossbar device) for a different output device (e.g., the next output device for which user data is available to be transmitted as identified in a pre-configured sequence for that crossbar device). Assuming only one bid is granted by each crossbar device at each slot, with this persistent/random scheme, all input devices would always be bidding for different output devices after a finite period, if there are sufficient traffic and spread of destination. This scheme can achieve 100% throughput for uniform loading as compared with 63.5% throughput for the random/random scheme in the 64×32×64 configuration.

Since the scheduler in each input device can handle as many as 32 scheduling decisions in one cell slot (i.e., the maximum number of links to crossbar devices in the switching stage), the congestion point is at the pending logic, and flow control is needed to suspend the scheduler properly. One possible flow control scheme is the window flow control with a constant window size. Other issues to consider are the disposition of the cell priority, the denied bids, and the choice and manner that the pending logic makes bids to the crossbar devices among the available cells.

FIG. 22 shows pseudocode for flow control between the pending logic and the input device scheduler, according to one embodiment of the present invention. This algorithm keeps the number of cells in the pending logic FIFO to below the parameter window for the case of single priority. The minimum value for the window parameter should be 32*latency in order not to under-run the bid/arbitration pipeline.

In a particular implementation that supports different traffic classes, when a bid for a low-priority routing queue is rejected, a low-priority cell in that queue is designated for rescheduling for service by the scheduler. In order to preserve the proper cell sequence, the cell that is to be rescheduled is the last low-priority cell in the queue. For example, if a routing queue has two low-priority cells and a bid for that queue is rejected, then the second low-priority cell is to be rescheduled, while another bid is transmitted for the first low-priority cell. If that second bid is also rejected, then the first low-priority cell will also be rescheduled for service. When the two low-priority cells are again scheduled for service, the order of the cells is preserved for proper sequencing.

Arbitration with Buffered Crossbar Architecture for Multiple Grants

Figure 23A:
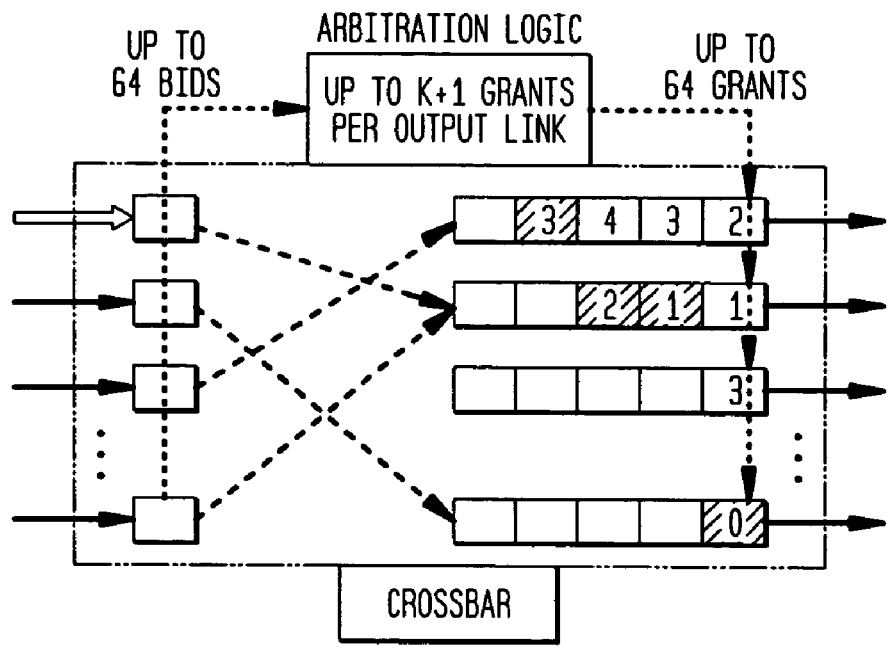
FIGS. 23a and 23b illustrate another alternative bid/arbitration scheme according to certain embodiments of the present invention.
Figure 23B:
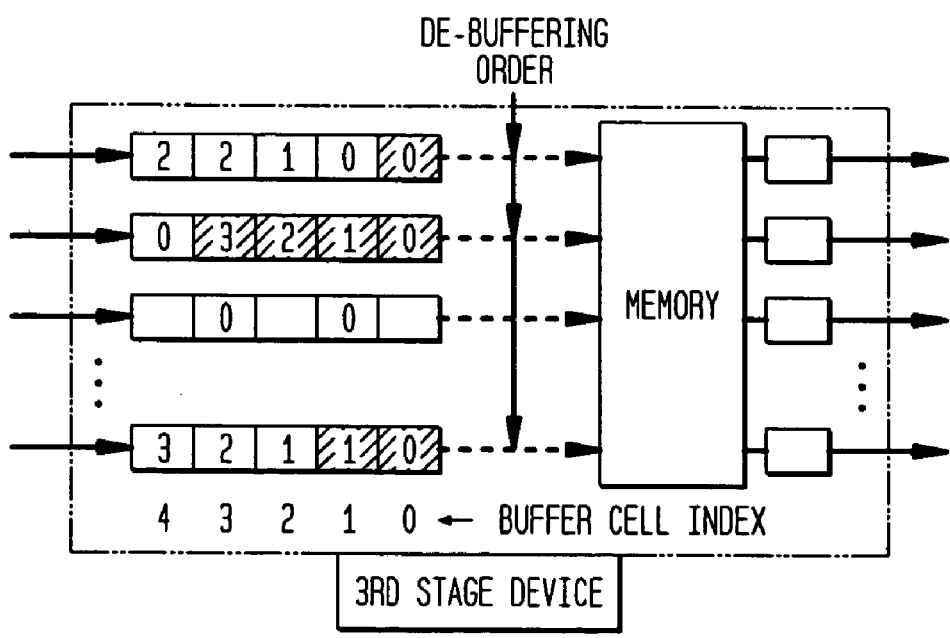

FIGS. 23a and 23b illustrate another alternative bid/arbitration scheme according to certain embodiments of the present invention. According to these embodiments, additional small FIFO buffers of K cells each are introduced at each of the crossbar device output ports, as illustrated in FIG. 23a. As such, the crossbar arbitration logic can now allow up to K+1 grants per crossbar output port in one cell slot. Since some cells could be admitted to the buffer in the previous cell slots, each buffer has a counter C(n) that represents the number of free cells in the buffer after slot n is executed. An algorithm is used to update this counter and track the state of the buffer so that it does not overflow. Note that slot n has two representations in time scale. One is when the bids for slot n arrive, and the other is when the cells from accepted bids arrive. The two points in time are separated by the round-trip delay (i.e., bid/grant latency).

Assume that there are L bids for a particular destination in slot n. One possible algorithm is as follows:

If $C(n-1)+1 \geq L$, then allocate grants to all L bids;

If $C(n-1)+1 < L$, then reject randomly $L-C(n-1)-1$ bids providing that lower priority bids are rejected first; and Update the counter: $C(n)=\min[C(n-1)+1-L', K]$, where L' is the number of accepted bids.

The same algorithm can be used for the case when the maximum number of grants allowed in one slot is smaller than K+1. In this case, L corresponds to the min [number of bids, maximum number of grants].

Note that, in the buffered crossbar architecture of FIGS. 23a and 23b, the cells can encounter different delay due to the additional buffer introduction. Therefore, the sequence of the cells sent from the same input device to the same switch output port could be changed since the cells could use different crossbar devices with different current buffer states. To avoid this problem, a protocol between the crossbar and output devices can be implemented to insure sequenced delivery to the output device queues. First, the crossbar output link port puts, into each cell header, information about the cell delay encountered in the buffer. For illustration purpose, FIG. 23a shows the cell delay of the cells in the buffer. Delay is defined by the buffer cell index to which the new cell is inserted. (Shaded cells in FIG. 23a are inserted in the current slot.) This information is used in the output devices to provide correct cell sequence.

The output device design is modified by introducing, for each input device, an additional buffer, working as a shift register, at the output device input link ports to provide resequencing of cells routed by different crossbar devices.

The additional buffer should have (K+1)-cell capacity (the same number as in the crossbar device). This solution is illustrated in FIG. 23b for K=4. Each buffer cell has its index from 0 to K. The arriving cells are first put into the buffer cells with index K. Then, every cell slot, the cells are moved to the buffer cells with index reducing by one. (In reality, the cells are preferably not moved, but rather the buffer cell indexes and pointers are changed to provide the same effect.)

In FIG. 23b, each buffer cell with a cell present is marked with a number that corresponds to the delay encountered in the crossbar device. This information is used to determine the cell eligibility for transfer to the queue memory. Namely, in each slot, the cells eligible for transfer to the memory are the ones which reside in the buffer cell with index equal to the cell delay encountered in the crossbar device. These cells are shaded in FIG. 23b. The transfer of eligible cells is performed in the same order as in the design from FIGS. 18a–b as far as the output device input ports are concerned, from top to bottom. The difference is that, for a given input port buffer, not one but all eligible cells are transferred in one sequence (the order within one buffer does not matter). This scheme provides that the required cell sequences are kept throughout the switch.

In the worst case, the output stage has to transfer up to 32*(K+1) cells from the output device input port buffers to the memory in one cell slot. If this is not possible due to physical limitations, an extended version can be used where the output device input port buffers are extended to negative buffer cell indexes. In this case, all cells with delay equal to or larger than the corresponding buffer cell indexes are eligible for transfer. Then, the algorithm works the same way as before with the exception that the cells with the largest difference between the delay index and the buffer cell index are transferred first (across all buffers). A buffer capacity of 2*(K+1) provides that all cells will be transferred without any loss if the transfer speed is the same as in the design of FIGS. 18a–b. The described protocol keeps the correct cell sequence without swapping cells or complex cell address calculations which is very important at such high speeds.

In certain implementations that support different traffic classes, a parameter P can be set to reserve a specified number of spaces in each crossbar buffer for high-priority cells. For example, assume a situation in which (a) each crossbar buffer can hold five cells, (b) the parameter P is set to three, and (c) a particular buffer currently has two low-priority cells and one high-priority cell. In that case, the two remaining spaces in the buffer are reserved for high-priority cells, and the buffer will be able to accept additional low-priority cells only after one or both of the currently stored low-priority cells are transmitted to the corresponding output device.

Arbitration with Buffered Crossbar Architecture for Reconsideration of Non-granted Bids Another type of bid arbitration involves the ability to reconsider, during the next time slot, one or more bids that are not granted during the current time slot. To implement such an arbitration scheme, each crossbar device 206 is implemented with a number of (e.g., 64) bid buffers, where each bid buffer is able to store a specified number of bids for reconsideration during the next time slot. Depending on the implementation, a given bid can be reconsidered a specified number of times before determining that the bid should be rejected. When arbitrating a collision during the subsequent time slot, preference can be given to bids that are being reconsidered as opposed to newly received bids that are being considered for the first time.

Figures 24, 25:
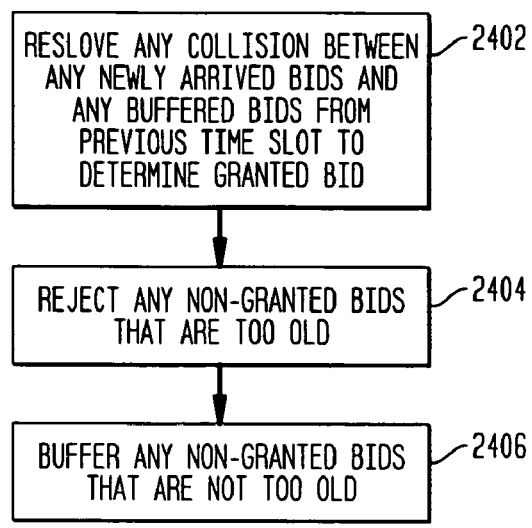
FIG. 24 is a flowchart showing the processing, performed in each crossbar device for each output device during each time slot, of a bid arbitration scheme that allows reconsideration of non-granted bids, according to one embodiment of the present invention, where a maximum of one bid is granted per time slot.
FIGS. 25 and 26 show performance results for the described switch architecture with buffers in the crossbar devices for uniform traffic and a 64×32×64 configuration.

FIG. 24 is a flowchart showing the processing, performed in each crossbar device for each output device during each time slot, of a bid arbitration scheme that allows reconsideration of non-granted bids, according to one embodiment of the present invention, where a maximum of one bid is granted per time slot.

In particular, collision resolution is performed to grant at most one bid, taking into account any new bids that just arrived for the current time slot as well as any old bids from the previous time slot that were stored in the corresponding bid buffer (step 2402 of FIG. 24). Depending on the implementation, the collision resolution make take into account the age of each bid. For example, older bids (i.e., bids that initially arrived at the crossbar device at an earlier time slot) may be given priority over newer bids.

Depending on the implementation, a bid that is not granted during the current time slot may be reconsidered a specified number of times. For example, in one implementation, a bid may be reconsidered only once. In that case, if a bid is not granted during either the time slot at which it arrived at the crossbar device or the next time slot, then such a bid will be rejected as being too old during that second time slot (step 2404). In other implementations, bids may be reconsidered a maximum number of times more than one, including an unlimited number of times.

Any remaining non-granted (i.e., which are not too old) are then stored in the corresponding bid buffer for reconsideration during the next time slot (step 2406). Depending on the particular implementation, the size of the bid buffers may be limited such that there may not be enough room in a bid buffer to store all of the non-granted bids that are not too old. In that case, one or more non-granted bids that are not too old may need to be rejected in step 2406. Depending on the implementation, the age of such bids may be taken into account to determine which bids to store and which bids to reject. For example, newer bids may be given priority over older bids, or vice versa. Alternatively or in addition, random selection can be implemented to determine which bids to store and which bids to reject.

In a switch fabric that allows non-granted bids to be reconsidered during the next time slot, the pending logic in each input device (which is responsible for generating bids) should wait until it receives either a grant or a rejection signal for a previously transmitted service request for a particular routing buffer before deciding how to proceed for that routing buffer.

Permutations of Various Scheme Features

The previous sections describe different features involved in different types of bid/arbitration schemes. Some of these were random bidding, persistent bidding, random arbitration, arbitration with multiple grants, and arbitration with reconsideration of non-granted bids. For different implementations of the present invention, two or more of these different features can be combined in a single implementation. In addition to the random bidding/random arbitration and persistent bidding/random arbitration combinations described previously, other permutations are also possible. For example, in combination with either random or persistent bidding, the arbitration scheme can be based on either arbitration with multiple grants or arbitration with reconsideration of non-granted bids.

In addition, either random or persistent bidding can be combined with an arbitration scheme that allows both multiple grants and reconsideration of non-granted bids. In such a scheme, when collision occurs, two or more grants are allowed for each time slot. If more bids are involved in a collision than the maximum number of grants allowed (or, in particular, the number of available positions in the crossbar device's cell buffer), then one or more additional bids that cannot be granted during the current time slot, may be buffered in the crossbar device's bid buffer for reconsideration during the next time slot (along with any newly arrived bids).

For example, assume a situation in which (1) each cell buffer can hold up to six grants, (2) a particular cell buffer already has two grants from a previous time slot, and (3) the current time slot has a seven-way collision. In that case, since there is room in the cell buffer for another four grants, four of the seven contending bids can be granted and buffered in the cell buffer during the current time slot. Depending on their age, one or more of the remaining three contending bids (i.e., the non-granted bids) may be stored in the bid buffer for reconsideration during the next time slot. Any bids that are neither granted nor stored for reconsideration are determined to be rejected, and corresponding rejection signals are sent back to the appropriate input devices for those bids.

Numerical Results

Due to the additional buffering introduced at the crossbar devices, the bid rejections caused by contention for the same output device are dramatically reduced and consequently a significant improvement in maximum utilization of the crossbars is achieved.

Figure 26:
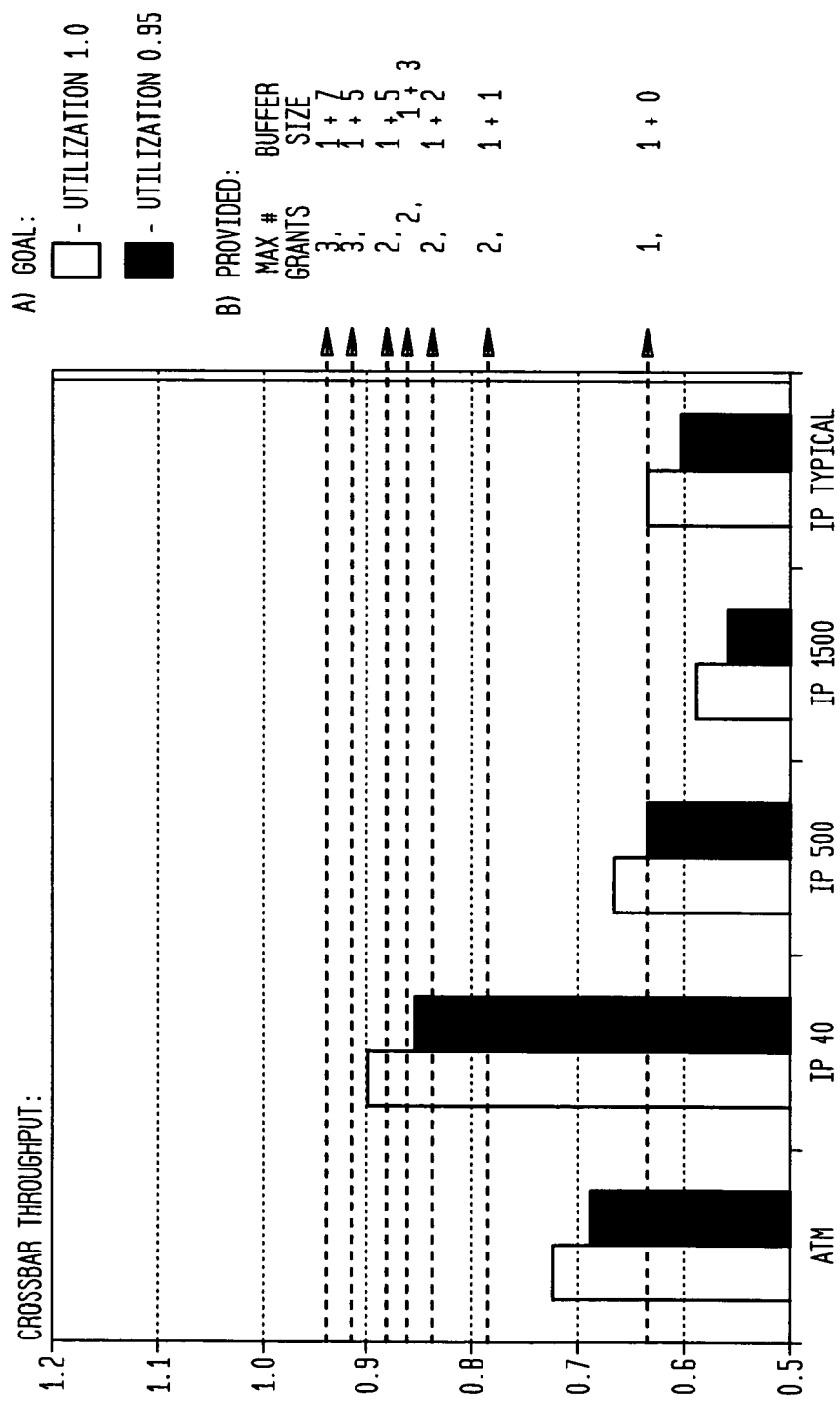

FIGS. 25 and 26 show performance results for the described switch architecture with buffers in the crossbar devices for uniform traffic and a 64×32×64 configuration. FIG. 25 shows Table I, in which the first column indicates the size K of the crossbar device output buffers, the second column indicates the throughput in terms of percentage of bids that are granted when all grants in the buffers are processed at each time slot, the third column indicates throughput when a maximum of 3 grants per time slot are processed, the fourth column indicates the throughput when a maximum of 2 grants per time slot are processed, and the fifth through seventh columns indicate the percentage gain in throughput for the results in the second through fourth columns, respectively, over the throughput without buffering (i.e., 63.5% throughput for K=0).

As shown in Table I, almost full crossbar capacity (99%) is achieved for K=30 cells. This corresponding to 55.9% gain over the no-buffer case. Nevertheless, to reduce both the complexity of the implementation and the additional delay introduced by buffering, the maximum number of grants per slot can be limited and smaller buffers can be used. For example, the case of K=5 with a maximum of 3 grants per time slot gives 91.6% throughput, corresponding to a 44.3% gain. If the maximum number of grants per time slot is further reduced to 2, then the throughput drops to 88.1%, corresponding to a 38.8% gain. Still, these numbers may be sufficient depending on what is considered the worst traffic pattern.

To provide a data view that would facilitate the choice of maximum number of grants and the buffer capacity, FIG. 26 shows (in bars) the required crossbar throughput for different packet sizes (indicated on the horizontal axis) and two levels of maximum design utilization (1.0 and 0.95). Horizontal dashed lines indicated the provided crossbar throughput for selected combinations of the buffer size and the maximum number of grants per time slot. The results indicate that, for ATM traffic, an architecture with maximum 2 grants and buffer size of 1+1 cells is sufficient. On the other hand, if sufficient throughput for the practical worst-case IP packet size of 40 bytes is to be provided, then an architecture with K=5 and maximum 3 grants per time slot will provide 100% utilization, while an architecture with K=3 and maximum 2 grants per time slot will provide 95% utilization.

Back-Pressure and Flow Control

Back-pressure is used for end-to-end flow control among switching elements and the traffic management line cards to maximize the usage of buffer memory. Preferred embodiments of the present invention rely on an efficient back-pressure (BP) and fast flow control scheme to achieve a highly scalable, lossless switch fabric architecture. Further, to support QoS classes, embodiments of the present invention regulate and control the allocation of the bandwidth across the switch fabric to different flows. Back-pressure is preferably applied selectively only to the traffic destined to congested ports. Furthermore, the switch fabric preferably allows selective back-pressure to be asserted on any traffic bound for an output device that has reached its buffer allocation limit.

Figure 27A:
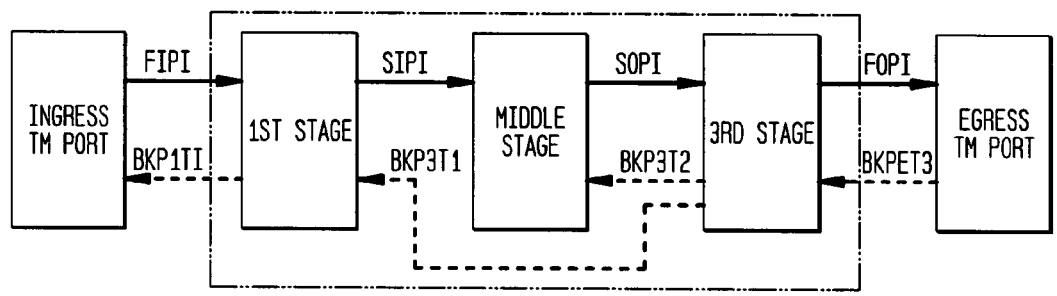
FIGS. 27a and 27b show the logic and actual flows, respectively, for data and back-pressure for a three-stage switch fabric, according to one embodiment of the present invention.
Figure 27B:
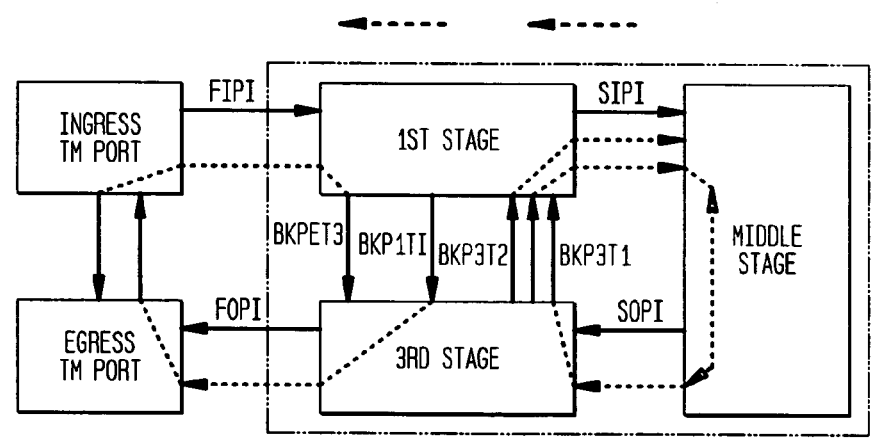

FIGS. 27a and 27b show the logic and actual flows, respectively, for data and back-pressure for a three-stage switch fabric, according to one embodiment of the present invention. Different back-pressure signals are transported either in-band or out-of-band. If BP signals flow along with data traffic between two adjacent devices, the BP signals are preferably embedded into the headers of the data cells. Examples of in-band transport of BP flows in FIGS. 27a and 27b are as follows:

Egress TM port to $3^{rd}$ stage back-pressure signal (BKPET3) is transported in-band from the ingress TM port to the $1^{st}$ stage;

$3^{rd}$ stage to $1^{st}$ stage back-pressure signal (BKP3T1) is transported in-band from the $1^{st}$ stage, through the middle stage, to the $3^{rd}$ stage;

$3^{rd}$ stage to middle stage back-pressure signal (BKP3T2) is transported in-band from the $1^{st}$ stage to the middle stage; and $1^{st}$ stage to ingress TM port back-pressure signal (BKP1TI) is transported in-band from the $3^{rd}$ stage to the egress TM port.

If back-pressure signals flow between two no-adjacent devices on the data path, they are transported on dedicated lines. Examples of such out-of-band transport of BP flows in FIGS. 27a and 27b are as follows:

Egress TM port to $3^{rd}$ stage back-pressure signal (BKPET3) is transported out-of-band from the $1^{st}$ stage to the $3^{rd}$ stage;

$3^{rd}$ stage to $1^{st}$ stage back-pressure signal (BKP3T1 is transported out-of-band from the $3^{rd}$ stage to the $1^{st}$ stage on both the generating pair and the receiving pair;

$3^{rd}$ stage to middle stage back-pressure signal (BKP3T2) is transported out-of-band from the $3^{rd}$ stage to the $1^{st}$ stage; and $1^{st}$ stage to ingress TM port back-pressure signal (BKP1TI) is transported out-of-band from the $1^{st}$ stage to the $3^{rd}$ stage.

To simplify system design, switch fabrics of the present invention preferably use only out-of-band control signals between an input device and its paired output device.

Preferred back-pressure and flow control schemes involve BP mechanisms (a) from the egress line cards to the output devices, (b) from the output devices to the input devices, (c) from the input devices to the ingress line cards, and (d) from the output devices to the crossbar devices.

There are three BP mechanisms from the output devices to the input devices: per queue, per port, and per device. The objective of the per queue BP mechanism is to block a routing queue in an input device when its corresponding queue in an output device exceeds a first specified threshold. The objective of the per port BP mechanism is to block all the input device queues that are associated with output device queues associated with a single port for which the total number of cells in the output device queues exceeds a second specified threshold. Finally, the objective of the per device BP mechanism is to block all the input device queues that are associated with queues in an output device for which the total number of cells in all of the queues in that output device exceeds a third specified threshold.

Figure 28:
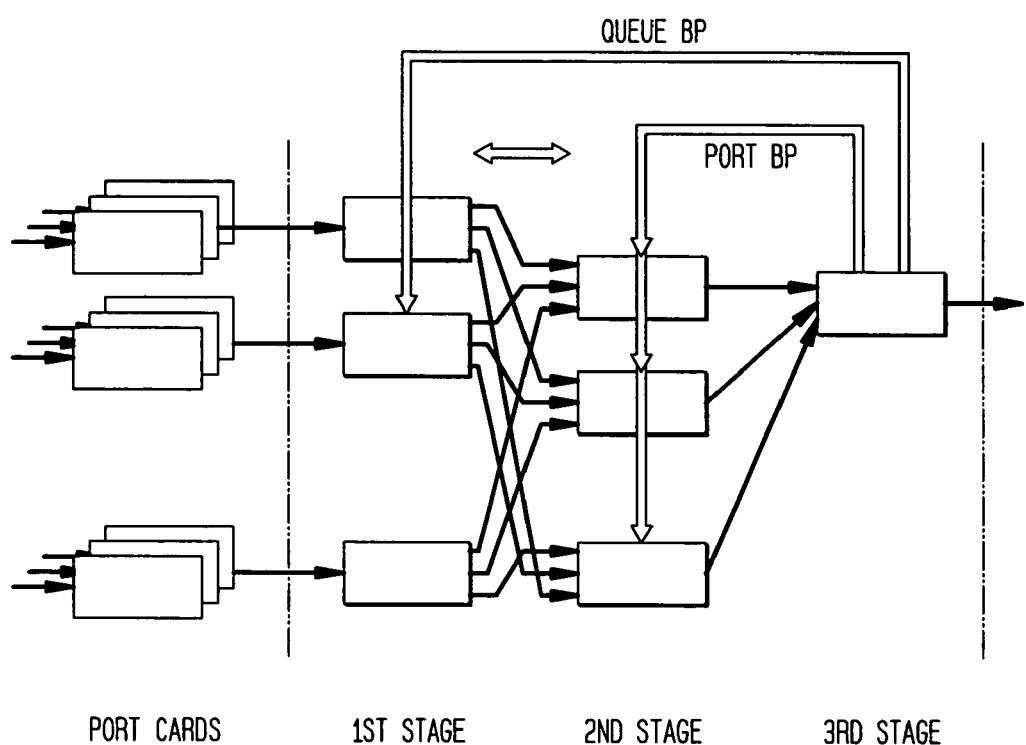
FIG. 28 shows a block diagram of part of a switch fabric to illustrate the back-pressure architecture according to one embodiment of the present invention.

FIG. 28 shows a block diagram of part of a switch fabric to illustrate the back-pressure architecture according to one embodiment of the present invention. Since the per device BP mechanism is realized by activating the per port BP mechanism for all ports belonging to the same output device, only the per port and per queue BP mechanisms are illustrated in FIG. 28.

The per port BP mechanism is an indirect BP mechanism, since the per port BP states are not sent from the output devices directly to the input devices. Rather, the BP state for each port is delivered to all of the crossbar devices. The bid arbitrator in each crossbar device uses these per port states in determining whether to accept or reject its current set of bids received from the input devices, where a bid is rejected if the corresponding BP state is active, indicating that the port is not available to receive any additional cells at this time. The per port BP states are sent periodically using dedicated in-band signaling channels on the following path: output device=>out-of-band=>paired input device=>in-band= >all crossbar devices. In particular, the per port BP states are transmitted out-of-band from the output device to its paired input device (e.g., using 3SBKP in FIGS. 5 and 7). Those per port BP states are then transmitted in-band from the paired input device to all of the crossbar devices. This solution also provides desired reliability since all crossbars have the same information.

One possible approach would be to apply the same solution for both the per port and the per queue BP mechanisms. There are two drawbacks to such an approach. First, in a well-configured system, the per queue BP will be activated significantly more often than the per port BP. This feature indicates that some fabric bandwidth can be underutilized due to the fact that bids are rejected due to the active per queue BP. This loss could be as high as 50% under some specific traffic scenarios. Second, since there are typically many more queues than ports, delivery of per queue BP states would take much more time than delivery of the per port BP states.

In order to avoid these problems, in preferred embodiments, the per queue BP states are delivered directly to the corresponding input devices using dedicated in-band signaling channels in the headers of cells transmitted between input and output devices via crossbar devices. The signaling path is as follows: output device=>out-of-band=>paired input device=>in-band=>corresponding output device via crossbar device=>out-of-band=>paired input device. In particular, the per queue BP states are transmitted out-of-band from the output device to its paired input device (e.g., using 3SBKP in FIGS. 5 and 7). Those per queue BP states are then transmitted in-band from the paired input device to one or more output devices via one or more crossbar devices. The per queue BP states are then transmitted out-of-band from the one or more output devices to their one or more paired input devices (e.g., using 3SBKP in FIGS. 5 and 7).

Figure 29:
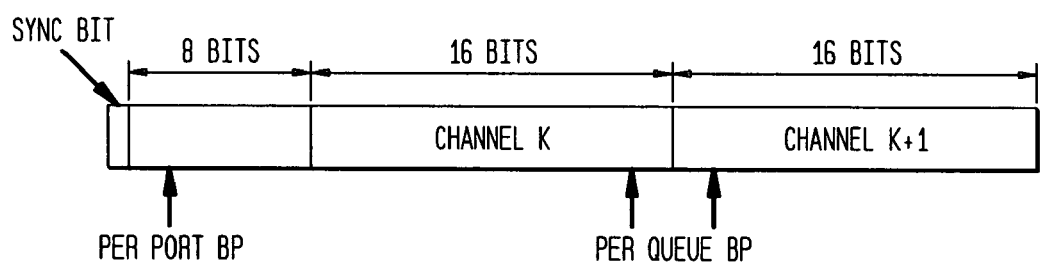
FIG. 29 illustrates the structure of back-pressure information in the headers of cells transmitted within the switch fabric, according to one embodiment of the present invention.

FIG. 29 illustrates the structure of BP information in the headers of cells transmitted within the switch fabric, according to one embodiment of the present invention. Each in-band channel connecting one input device with one output device has a capacity of 16 bits per slot. This is sufficient to transfer all per queue BP states every 2 slots (2 traffic classes*16 queues). In the input device, the per queue BP states are stored in a state table and used to block the back-pressured queues from being considered by the input device scheduler. In other words, the scheduler in the input device will not send a bid to the bid arbitrator in any crossbar device for an input device queue that is otherwise ready to transmit user data to a crossbar device, if the per queue BP state for the corresponding queue in the output device indicates that that output device queue is back-pressured (i.e., not currently available to receive any additional user data).

This architecture has certain advantages. Among them is that, due to the low per queue BP, per queue QoS features can be supported effectively in the fabric. In addition, since the BP state is delivered directly to the corresponding input device, there is no loss of internal fabric bandwidth since back-pressured flows would not contend for the bandwidth.

In terms of the reliability consideration of the per queue BP signaling, there are at least two solutions. One solution is to use redundant channels by introducing two channels per input device/output device pair. This solution increases the per queue BP latency from 2 to 4 slots. Another solution assumes that, since, from the reliability viewpoint, the most important thing is to provide the lossless feature, one can relegate this feature to the per port and per device BP mechanisms. In this case, once there is a link failure, the BP states in the corresponding input device are set to zero (i.e., no back-pressure).

With judicious setting of the back-pressure thresholds per device, per port, and per queue, an efficient lossless fabric operation can be achieved with per queue QoS and minimum buffers on device.

Although the present invention has been described in the context of electronic switch fabrics, those skilled in the art will understand that the present invention can also be implemented in the context of optical switch fabrics as well as switch fabrics that involve both electronic and optical processes.

The present invention may be implemented as circuit-based processes, including possible implementation on and fabrication as one or more integrated circuits. As would be apparent to one skilled in the art, various functions of circuit elements may also be implemented as processing steps in a software program. Such software may be employed in, for example, a digital signal processor, micro-controller, or general-purpose computer.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A switch fabric for routing data from one or more sources towards one or more destinations, comprising a switching stage configured between an input stage and an output stage wherein:
- the input stage is configured to receive the data transmitted from the one or more sources and forward the data to the switching stage;
- the switching stage is configured to route the data received from the input stage to the output stage;
- the output stage is configured to transmit the data received from the switching stage towards the one or more destinations;
- the input stage comprises a plurality of input devices, each input device performing a port expansion function;
- the switching stage comprises one or more crossbar devices, each crossbar device performing a data routing function;
- the output stage comprises a plurality of output devices, each output device performing a port contraction function;
- each input device transmits bids to the one or more crossbar devices to request connections through the switching stage for routing the data to the output devices; and
- each crossbar device comprises:
  - (1) a bid arbitrator configured to determine whether to accept or reject each received bid, wherein, in response to a collision between multiple bids, the bid arbitrator accepts two or more of the colliding bids in a single time slot; and
  - (2) memory for storing one or more accepted cells for the same output device, wherein the crossbar device can transmit grant signals for two or more accepted bids for the same output device in a single time slot.

2. The invention of claim 1, wherein, for each crossbar device, a maximum number of accepted bids for each output device is equal to one plus a number of available memory spaces associated with that output device.

3. The invention of claim 1, wherein each output device has a cell shift register for each input device to provide resequencing of cells routed by different crossbar devices.

4. The invention of claim 1, wherein, for each crossbar device, a maximum number of accepted cells that can be stored in memory for each output device is greater than a maximum number of grant signals for that output device that can be transmitted in a single time slot.

5. The invention of claim 1, wherein each crossbar device has a different cell queue for each output device connected to that crossbar device, wherein the cell queue stores the one or more accepted cells for that output device.

6. The invention of claim 1, wherein each crossbar device has a different cell queue for each output device connected to that crossbar device, wherein a specified number of spaces in each cell queue is reserved for high-priority cells.

7. The invention of claim 1, wherein each output device has a different cell shift register for each crossbar device connected to that output device, wherein the shift register moves incoming cells one place per slot until an incoming cell is eligible to be transferred to an output port.

8. The invention of claim 1, wherein the switch fabric is fabricated as one or more integrated circuits.

9. A switch fabric for routing data from one or more sources towards one or more destinations, comprising a switching stage configured between an input stage and an output stage wherein:
- the input stage is configured to receive the data transmitted from the one or more sources and forward the data to the switching stage;
- the switching stage is configured to route the data received from the input stage to the output stage;
- the output stage is configured to transmit the data received from the switching stage towards the one or more destinations;
- the input stage transmits bids to the switching stage to request connections through the switching stage for routing the data to the output stage; and
- the switching stage comprises:
  - (1) a bid arbitrator configured to determine whether to accept or reject each bid; and
  - (2) memory for storing one or more of the bids received from the input stage, wherein the bid arbitrator is configured to re-consider whether to accept a stored bid that was not accepted in a previous time slot.

10. The invention of claim 9, wherein:
- the input stage comprises a plurality of input devices, each input device performing a port expansion function;
- the switching stage comprises one or more crossbar devices, each crossbar device performing a data routing function;
- the output stage comprises a plurality of output devices, each output device performing a port contraction function;
- each input device is configured to transmit bids to the one or more crossbar devices to request connections through the switching stage for routing the data to the output devices;
- each crossbar device is configured to determine whether to accept or reject each bid received from an input device and the transmit a grant/rejection signal to that input device identifying whether the bid is accepted or rejected; and
- each crossbar device comprises:
  - (1) a bid arbitrator configured to determine whether to accept or reject each bid; and
  - (2) memory for storing one or more of the bids received from the input devices, wherein the bid arbitrator is configured to re-consider whether to accept a stored bid that was not accepted in a previous time slot.

11. The invention of claim 9, wherein the switch fabric is fabricated as one or more integrated circuits.

* * * * *

UNITED STATES PATENT AND TRADEMARK OFFICE
CERTIFICATE OF CORRECTION

| | | |
|---|---|---|
| PATENT NO. | : 7,023,841 B2 | |
| APPLICATION NO. | : 10/017174 | |
| DATED | : April 4, 2006 | |
| INVENTOR(S) | : Martin S. Dell et al. | |

It is certified that error appears in the above-identified patent and that said Letters Patent is hereby corrected as shown below:

US Pat.
In Section (56), References Cited, on page 2, replace "6,864,154" with --6,865,154--.

Signed and Sealed this

First Day of August, 2006

JON W. DUDAS
*Director of the United States Patent and Trademark Office*